(12) United States Patent
Fresa

(10) Patent No.: US 12,650,726 B1
(45) Date of Patent: Jun. 9, 2026

(54) GRID-FRIENDLY HOLDOVER AND RAMP CONTROL FOR MINERS DURING LOSS OF WORK

(71) Applicant: Marc Fresa, Shelton, CT (US)

(72) Inventor: Marc Fresa, Shelton, CT (US)

(73) Assignee: Marc Fresa, Shelton, CT (US)

( * ) Notice: Subject to any disclaimer, the term of this patent is extended or adjusted under 35 U.S.C. 154(b) by 0 days.

(21) Appl. No.: 19/396,570

(22) Filed: Nov. 21, 2025

(51) Int. Cl.
| | |
|---|---|
| *G06F 1/00* | (2006.01) |
| *G06F 1/3296* | (2019.01) |
| *G06F 1/3203* | (2019.01) |
| *H04L 9/00* | (2022.01) |

(52) U.S. Cl.
CPC .......... *G06F 1/3296* (2013.01); *G06F 1/3203* (2013.01); *H04L 9/50* (2022.05)

(58) Field of Classification Search
CPC ................................. G06F 1/3296; H04L 9/50
USPC ........................................................ 713/323
See application file for complete search history.

(56) References Cited

U.S. PATENT DOCUMENTS

| | | | | |
|---|---|---|---|---|
| 10,884,810 | B1 * | 1/2021 | Verma ..................... | H04L 67/02 |
| 11,157,899 | B1 * | 10/2021 | Nelson .................. | G06F 9/4401 |
| 12,112,208 | B1 * | 10/2024 | Minehan ................ | G06Q 40/04 |
| 12,210,616 | B1 * | 1/2025 | Razinskas ............... | G06F 21/54 |
| 2019/0220603 | A1 * | 7/2019 | Gopalakrishnan ...... | G06F 21/64 |
| 2021/0084060 | A1 * | 3/2021 | Garg ................... | H04L 63/1466 |
| 2023/0037377 | A1 * | 2/2023 | Fresa ..................... | G06F 1/206 |
| 2023/0139439 | A1 * | 5/2023 | Smeloy ................. | H04L 9/3297 713/320 |
| 2023/0185738 | A1 * | 6/2023 | Steinmetz ........... | G06F 13/1668 705/64 |
| 2023/0410102 | A1 * | 12/2023 | Fletcher .................... | H04L 9/50 |
| 2024/0240830 | A1 * | 7/2024 | Benson ................. | F24H 15/174 |

* cited by examiner

*Primary Examiner* — Volvick Derose
(74) *Attorney, Agent, or Firm* — Barnes & Thornburg LLP

(57) ABSTRACT

A non-transitory computer-readable medium causes a processor to detect a loss of work for a plurality of cryptocurrency mining machines. The processor then sends one or more commands that cause the plurality of cryptocurrency mining machines to enter a group holdover state.

30 Claims, 9 Drawing Sheets

500　　　　　　POWER CONTROL PROFILE

| LOSS OF WORK | HOLDOVER | POWER DOWN | POWER UP |
|---|---|---|---|
| | 600 | 700 | 800 |

INTERNET CONNECTIVITY　502

Detect Loss　　　　　　　　　　　　　　Hysteresis Delay [ # ]
　⋯ Heartbeat　[ | OFF ]　Pings [#]　Time [#]　　Controller [ <select> ▼ ]
　⋯ Ping Ack　[ ON ■ ]　Pings [#]　Time [#]　　Controller [ <select> ▼ ]
Detect Available　　　　　　　　　　　　Hysteresis Delay [ # ]
　⋯ Heartbeat　[ | OFF ]　Pings [#]　Time [#]　　Controller [ <select> ▼ ]
　⋯ Ping Ack　[ ON ■ ]　Pings [#]　Time [#]　　Controller [ <select> ▼ ]

POOL CONNECTIVITY　504

Detect Loss　　　　　　　　　　　　　　　　　　Hysteresis Delay [ # ]
　⋯ Heartbeat　[ | OFF ]　Pings [#]　Time [#]　Pools [ <select> ▼ ]　Controller [ <select> ▼ ]
　⋯ Ping Ack　[ ON ■ ]　Pings [#]　Time [#]　Pools [ <select> ▼ ]　Controller [ <select> ▼ ]
Detect Available　　　　　　　　　　　　　　　　Hysteresis Delay [ # ]
　⋯ Heartbeat　[ | OFF ]　Pings [#]　Time [#]　Pools [ <select> ▼ ]　Controller [ <select> ▼ ]
　⋯ Ping Ack　[ ON ■ ]　Pings [#]　Time [#]　Pools [ <select> ▼ ]　Controller [ <select> ▼ ]

SHARE SUBMISSION　506

Detect Loss　　　　　　　　　　　　　　　　　　　Hysteresis Delay [ # ]
　⋯ Primary　[ ON ■ ]　Submit Fails [#]　Pool [ <select> ▼ ]　Controller [ <select> ▼ ]
　⋯ Secondary　[ ON ■ ]　Submit Fails [#]　Pool [ <select> ▼ ]　Controller [ <select> ▼ ]
Detect Available　　　　　　　　　　　　　　　　　Hysteresis Delay [ # ]
　⋯ Primary　[ ON ■ ]　Submit Fails [#]　Pool [ <select> ▼ ]　Controller [ <select> ▼ ]
　⋯ Backup　[ ON ■ ]　Submit Fails [#]　Pool [ <select> ▼ ]　Controller [ <select> ▼ ]

GET WORK　508

Detect Loss　　　　　　　　　　　　　　　　　　Hysteresis Delay [ # ]
　⋯ Primary　[ ON ■ ]　Get Fails [#]　Pool [ <select> ▼ ]　Controller [ <select> ▼ ]
　⋯ Secondary　[ ON ■ ]　Get Fails [#]　Pool [ <select> ▼ ]　Controller [ <select> ▼ ]
Detect Available　　　　　　　　　　　　　　　　Hysteresis Delay [ # ]
　⋯ Primary　[ ON ■ ]　Get Fails [#]　Pool [ <select> ▼ ]　Controller [ <select> ▼ ]
　⋯ Backup　[ ON ■ ]　Get Fails [#]　Pool [ <select> ▼ ]　Controller [ <select> ▼ ]

GROUP CONTROLLER　550

Detect Loss　　　　　　　　　　　　　　　　　　　Hysteresis Delay [ # ]
　⋯ Condition [ <select> ▼ ]　Condition Parameter(s) [ #, # ]　Notice Type [ <select> ▼ ]
　⋯ Condition [ <select> ▼ ]　Condition Parameter(s) [ #, # ]　Notice Type [ <select> ▼ ]
Detect Available　　　　　　　　　　　　　　　　　Hysteresis Delay [ # ]
　⋯ Condition [ <select> ▼ ]　Condition Parameter(s) [ #, # ]　Notice Type [ <select> ▼ ]
　⋯ Condition [ <select> ▼ ]　Condition Parameter(s) [ #, # ]　Notice Type [ <select> ▼ ]

[ SAVE ]　[ DEPLOY ]

FIG. 6　　　400

Figure 7:
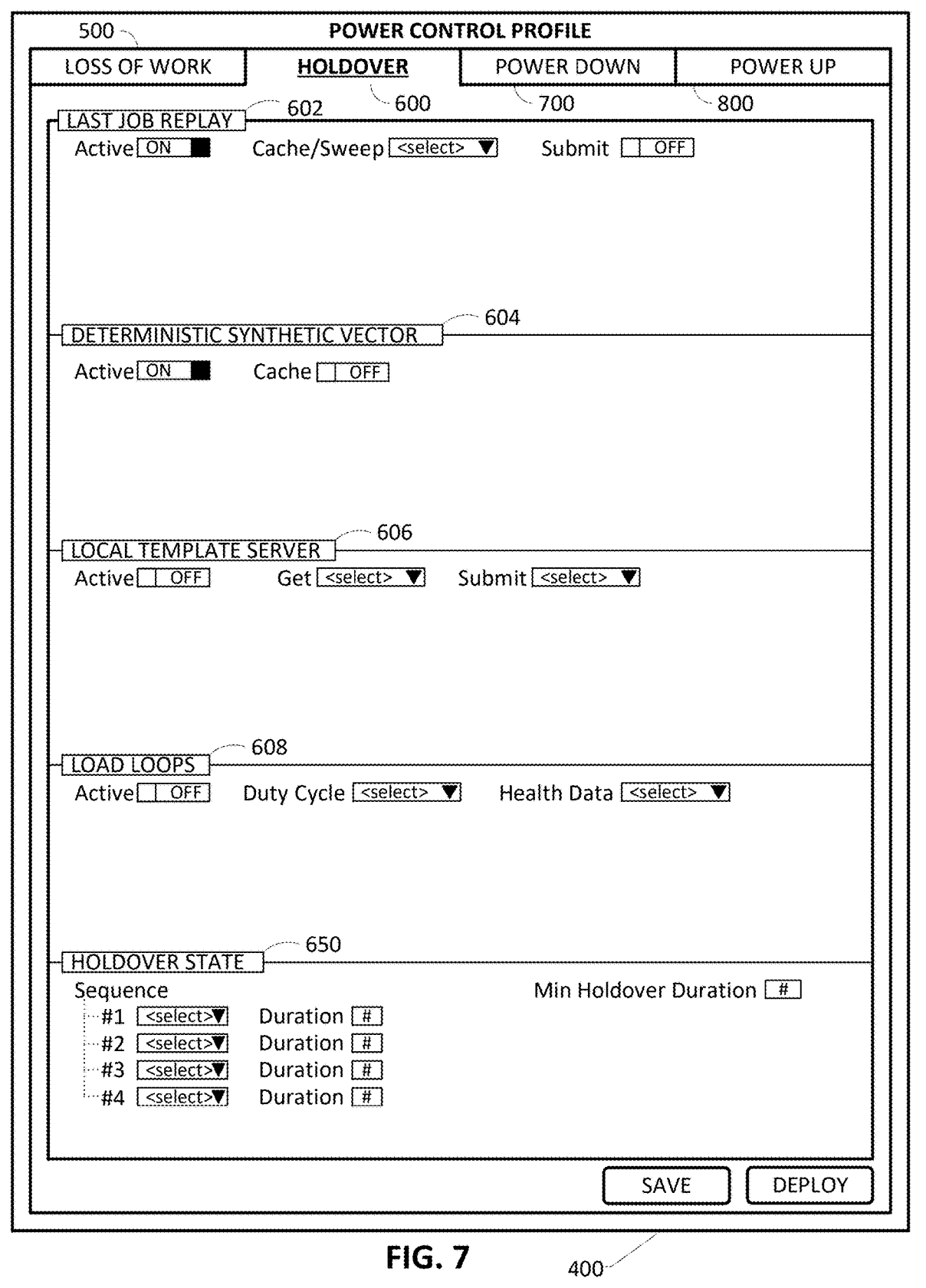

500 — POWER CONTROL PROFILE

| LOSS OF WORK | HOLDOVER | POWER DOWN | POWER UP |
|---|---|---|---|

602    — 600    — 700    — 800

LAST JOB REPLAY

Active [ON ■]    Cache/Sweep [<select> ▼]    Submit [☐ OFF]

— 604

DETERMINISTIC SYNTHETIC VECTOR

Active [ON ■]    Cache [☐ OFF]

— 606

LOCAL TEMPLATE SERVER

Active [☐ OFF]    Get [<select> ▼]    Submit [<select> ▼]

— 608

LOAD LOOPS

Active [☐ OFF]    Duty Cycle [<select> ▼]    Health Data [<select> ▼]

— 650

HOLDOVER STATE

Sequence                                Min Holdover Duration [#]

- #1 [<select>▼]    Duration [#]
- #2 [<select>▼]    Duration [#]
- #3 [<select>▼]    Duration [#]
- #4 [<select>▼]    Duration [#]

[ SAVE ]    [ DEPLOY ]

FIG. 7                400

Figure 8:
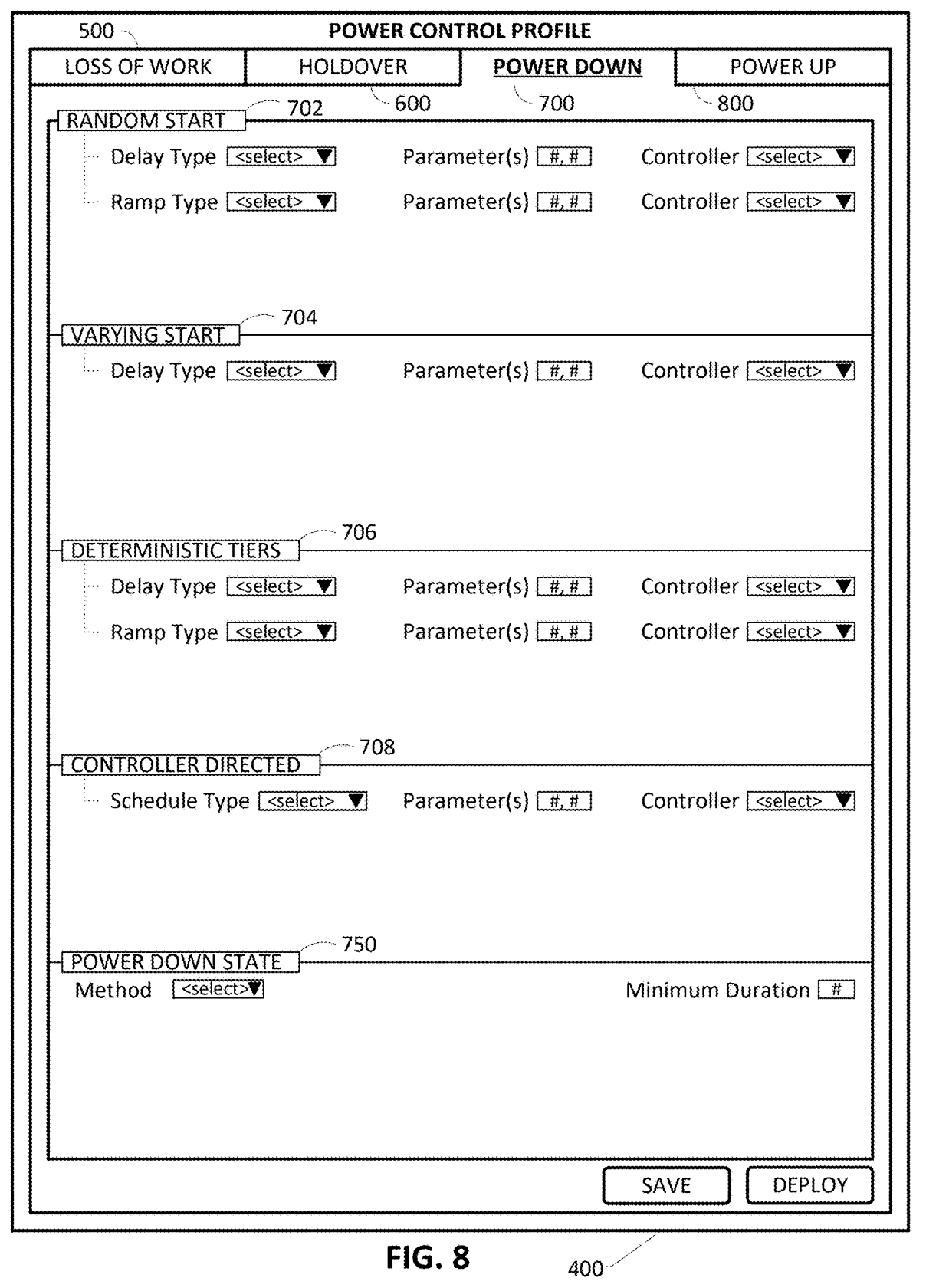

500 — POWER CONTROL PROFILE

| LOSS OF WORK | HOLDOVER | POWER DOWN | POWER UP |

— 702    — 600    — 700    — 800

RANDOM START

- Delay Type  [<select> ▼]        Parameter(s) [ #, # ]        Controller [<select> ▼]
- Ramp Type  [<select> ▼]        Parameter(s) [ #, # ]        Controller [<select> ▼]

— 704

VARYING START

- Delay Type  [<select> ▼]        Parameter(s) [ #, # ]        Controller [<select> ▼]

— 706

DETERMINISTIC TIERS

- Delay Type  [<select> ▼]        Parameter(s) [ #, # ]        Controller [<select> ▼]
- Ramp Type  [<select> ▼]        Parameter(s) [ #, # ]        Controller [<select> ▼]

— 708

CONTROLLER DIRECTED

- Schedule Type  [<select> ▼]        Parameter(s) [ #, # ]        Controller [<select> ▼]

— 750

POWER DOWN STATE

Method  [<select>▼]                                Minimum Duration [ # ]

[ SAVE ]  [ DEPLOY ]

FIG. 8          400 —

Figure 9:
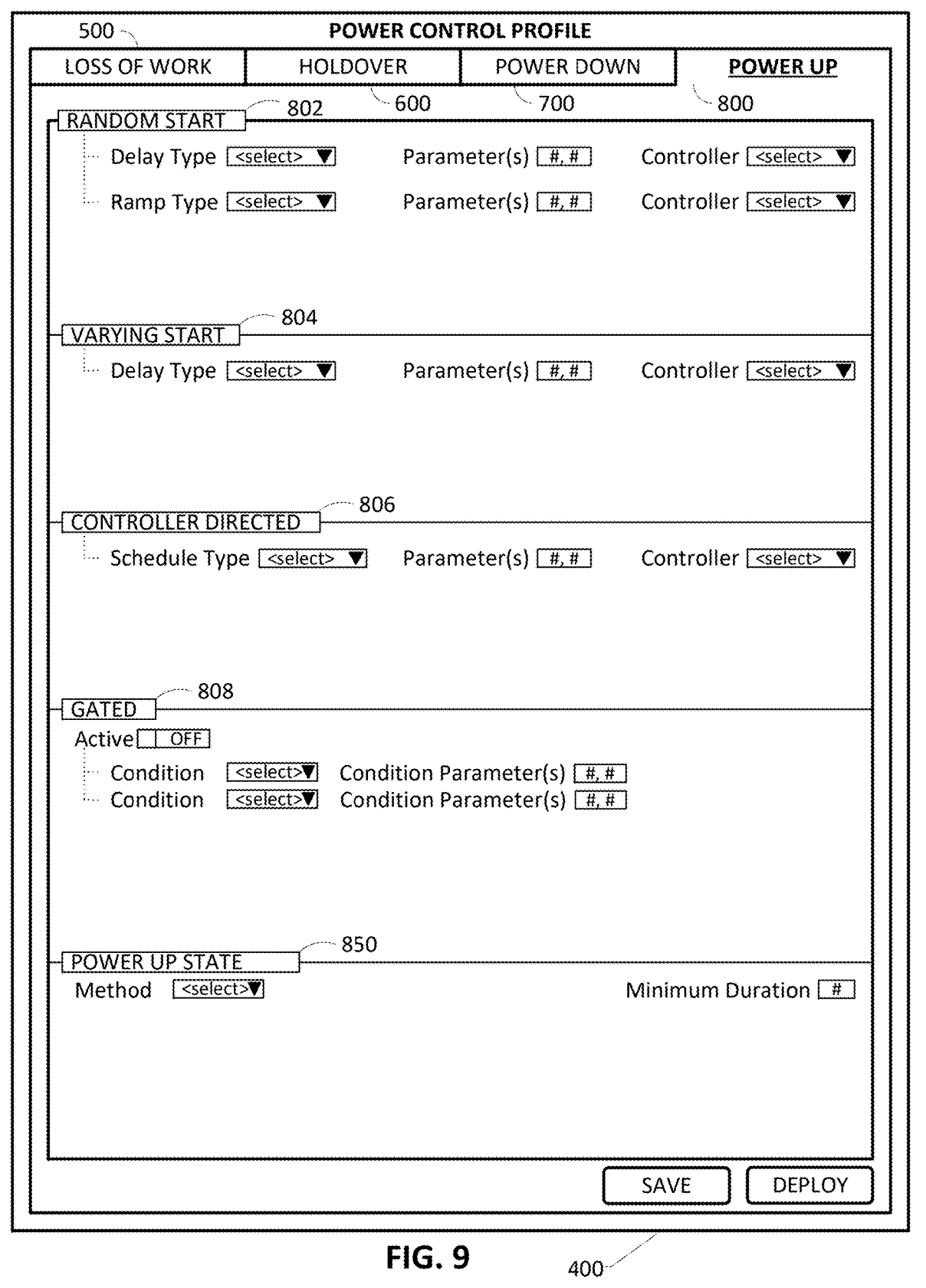

500 — POWER CONTROL PROFILE

| LOSS OF WORK | HOLDOVER | POWER DOWN | POWER UP |
| --- | --- | --- | --- |

602 — 600 — 700 — 800

RANDOM START

Delay Type  [<select> ▼]        Parameter(s) [#, #]        Controller [<select> ▼]

Ramp Type  [<select> ▼]        Parameter(s) [#, #]        Controller [<select> ▼]

804 —

VARYING START

Delay Type  [<select> ▼]        Parameter(s) [#, #]        Controller [<select> ▼]

806 —

CONTROLLER DIRECTED

Schedule Type [<select> ▼]        Parameter(s) [#, #]        Controller [<select> ▼]

808 —

GATED

Active [  OFF ]

Condition  [<select>▼]  Condition Parameter(s) [#, #]

Condition  [<select>▼]  Condition Parameter(s) [#, #]

850 —

POWER UP STATE

Method  [<select>▼]                        Minimum Duration [#]

[ SAVE ]   [ DEPLOY ]

GRID-FRIENDLY HOLDOVER AND RAMP CONTROL FOR MINERS DURING LOSS OF WORK

TECHNICAL FIELD

The present disclosure relates to power management of a group of miners.

BACKGROUND

Managing the power of a large group of cryptocurrency mining machines (also referred to herein as miners) is important for maintaining electrical grid stability. Miners require large amounts of power, and the vast majority of the power used by miners is from processing power that is consumed by mining chips for solving complex mathematical computations when actively mining digital currency.

Mining chips, such as application-specific integrated chips (ASIC), or field programmable gate array chips (FPGA), are embedded with specific mining algorithms tailored for mining different types of digital coins. For example, ASIC chips employ SHA-256 algorithms for mining bitcoins. The speed at which these algorithms solve mathematical equations, or the amount of calculations performed per second, is generally referred to as hashrate. As hashrate increases, so does the speed of mining digital coins and the overall power consumption.

Large scale mining operations typically operate as part of one or more mining pools. A mining site operated by a mining operator may typically consist of a large group of miners (e.g., 1,000 to 100,000 miners per group). Typically, each miner in a group will connect over a network to a remote pool where the pool's work contributes to the overall work that is undertaken to solve the next block of a blockchain. It is also known that in some alternate scenarios miners are configured to solve blocks of blockchain over the Internet without connecting to a remote pool. When a block is solved, the work contribution by each miner in the group (and in the pool) will be determined by the pool and the pool will award a reward share to each miner who contributed valid proof-of-work.

When a group of miners (for example at a mining site) loses network connectivity to the pool, the current default behavior of the miners is to stop hashing and remain idle or shut down. Either action in the default behavior creates a sudden, synchronized drop in electrical load as the all the miners with lost connectivity stop hashing within a very short period of time. At datacenter scale, the loss of pool connectivity for the group of miners at a site, and the resultant drop in aggregate power consumption by the group of miners at the site, can disturb transmission feeder lines and transformers supplying power to the group(s) at the site. Likewise, after connectivity returns, the current default behavior is that every previously-disconnected miner will attempt to restart hashing, resulting in a surge in power consumption at the site.

SUMMARY

The present disclosure includes one or more of the features recited in the appended claims and/or the following features which, alone or in any combination, may comprise patentable subject matter.

As disclosed herein, systems, software, and methods are disclosed that mitigate the grid-scale power effects of a loss of network connectivity for a group of miners.

As one example, upon the loss of anticipated or actual remote work delivery to a group of miners, for example where a remote mining pool is unreachable (e.g., through loss network connectivity) and as evidenced by, for example, Stratum timeouts, each individual miner switches to locally-supplied substitute work, instead of using remote work delivery via the network connection. Consequently, each miner continues to draw power similar to, or equivalent to, the consumed power as if it had not lost network connectivity. Alternatively or additionally, the group of miners may reduce group power consumption gradually, for example if the network outage is persistent. In another embodiment, when connectivity returns, the group of miners may gradually increase power consumption.

The invention provides a non-transitory computer-readable medium with instructions that detect when cryptocurrency mining machines lose work availability and cause them to enter a group holdover state where they consume substantially the same power as normal operation but cannot earn rewards.

In some embodiments, the loss of work detection involves identifying when network connectivity is lost between the cryptocurrency mining machines and a remote mining pool.

In some embodiments, the network connectivity loss detection may be accomplished by monitoring for failed ping acknowledgments or missed heartbeat pings from the remote mining pool.

In some embodiments, the loss of work detection involves identifying failed share submissions from at least one cryptocurrency mining machine to a remote mining pool.

In some embodiments, the loss of work detection may involve identifying failed work requests from at least one cryptocurrency mining machine to a remote mining pool.

In some embodiments, the group holdover state involves causing the cryptocurrency mining machines to perform substitute work, which may include replaying last job data, generating deterministic synthetic vectors, retrieving work from a local template server, or performing load loop self-tests.

In some embodiments, the substitute work may involve replaying cached header data and Merkle data from a previously received job.

In some embodiments, the system may detect when work becomes available again and cause the cryptocurrency mining machines to exit the group holdover state and return to normal operation.

In some embodiments, after a predetermined duration in the group holdover state, the system may cause the cryptocurrency mining machines to enter a group power down state with gradually reduced power consumption over time.

In some embodiments, the group power down state may involve causing individual cryptocurrency mining machines to reduce power consumption at different times to create a gradual reduction in total power consumption across the group.

The invention provides a non-transitory computer-readable medium with instructions that detect connectivity loss between a remote mining pool and cryptocurrency mining machines, then cause the machines to switch from retrieving work from the remote pool to generating and using substitute work for hashing.

In some embodiments, the substitute work may involve replaying cached header data and Merkle data from a previously received job.

In some embodiments, the substitute work may involve generating synthetic header data using pseudo-random numbers.

In some embodiments, the substitute work may involve retrieving work from a local template server on a local network.

In some embodiments, the substitute work may involve performing load loop self-tests that exercise mining chips in the cryptocurrency mining machines.

In some embodiments, after a predetermined condition is met, the system may cause the cryptocurrency mining machines to enter a group power down state where individual machines reduce power consumption at different times.

In some embodiments, the group power down state may involve causing the cryptocurrency mining machines to individually determine respective delay times from a range of times and reduce power consumption after waiting their determined delay times.

In some embodiments, the group power down state may involve causing pre-defined subgroups of cryptocurrency mining machines to reduce power consumption at different pre-determined times.

In some embodiments, the system may detect when connectivity has been restored and cause the cryptocurrency mining machines to enter a group power up state.

In some embodiments, the group power up state may involve causing cryptocurrency mining machines to individually increase power consumption gradually over time at different start times to create a controlled increase in total power consumption.

In some embodiments, the group power up state may involve determining whether a gate condition is cleared before allowing the cryptocurrency mining machines to increase power consumption.

In some embodiments, the connectivity between the remote mining pool and cryptocurrency mining machines may be via a mining pool proxy, and the loss of connectivity detection may involve identifying connectivity loss between the remote pool and proxy or between the machines and proxy.

The invention provides a method for power management involving causing cryptocurrency mining machines to perform substitute hashing work that consumes substantially the same power as normal hashing but does not generate valid hashes for cryptocurrency mining rewards.

In some embodiments, the substitute hashing work may be initiated by power control firmware stored locally on each cryptocurrency mining machine, where the firmware independently determines when to begin the substitute work.

In some embodiments, the substitute hashing work may be initiated by instructions from a group controller sent to the cryptocurrency mining machines over a local network, where the controller coordinates the timing.

In some embodiments, the substitute hashing work may be initiated by instructions from both local power control firmware and a group controller, where the firmware generates the substitute work and the controller provides instructions to generate it.

The invention provides a system including a cryptocurrency mining machine with a processor, data storage, and mining chip, along with power control firmware that determines connectivity loss, generates substitute data, and causes the mining chip to perform hashing work based on the substitute data while maintaining the same power consumption.

In some embodiments, the power control firmware may detect when substitute hashing work has been performed for a predetermined duration and cause the cryptocurrency mining machine to gradually reduce power consumption over time.

In some embodiments, the power control firmware may cause the cryptocurrency mining machine to reduce power consumption at a different time from other machines in a group, creating a gradual reduction in total power consumption across the group.

In some embodiments, the power control firmware may cause the cryptocurrency mining machine to reduce power consumption by decreasing mining chip voltage and/or processing frequency over a ramp down period.

Additional features, which alone or in combination with any other feature(s), such as those listed above and/or those listed in the claims, can comprise patentable subject matter and will become apparent to those skilled in the art upon consideration of the following detailed description of various embodiments exemplifying carrying out the embodiments as presently perceived.

BRIEF DESCRIPTION OF THE DRAWINGS

The drawing figures depict one or more implementations in accordance with the present teachings, by way of example only, not by way of limitation. These figures are intended to illustrate and not to restrict the scope of the disclosure. In the figures, like reference numerals refer to the same or similar elements. This convention is maintained throughout the drawings for consistency.

FIG. 6 illustrates a screen of a graphical user interface dashboard for miner power management software;

FIG. 7 illustrates a screen of a graphical user interface dashboard for miner power management software;

FIG. 8 illustrates a screen of a graphical user interface dashboard for miner power management software; and FIG. 9 illustrates a screen of a graphical user interface dashboard for miner power management software.

DETAILED DESCRIPTION

Figure 1:
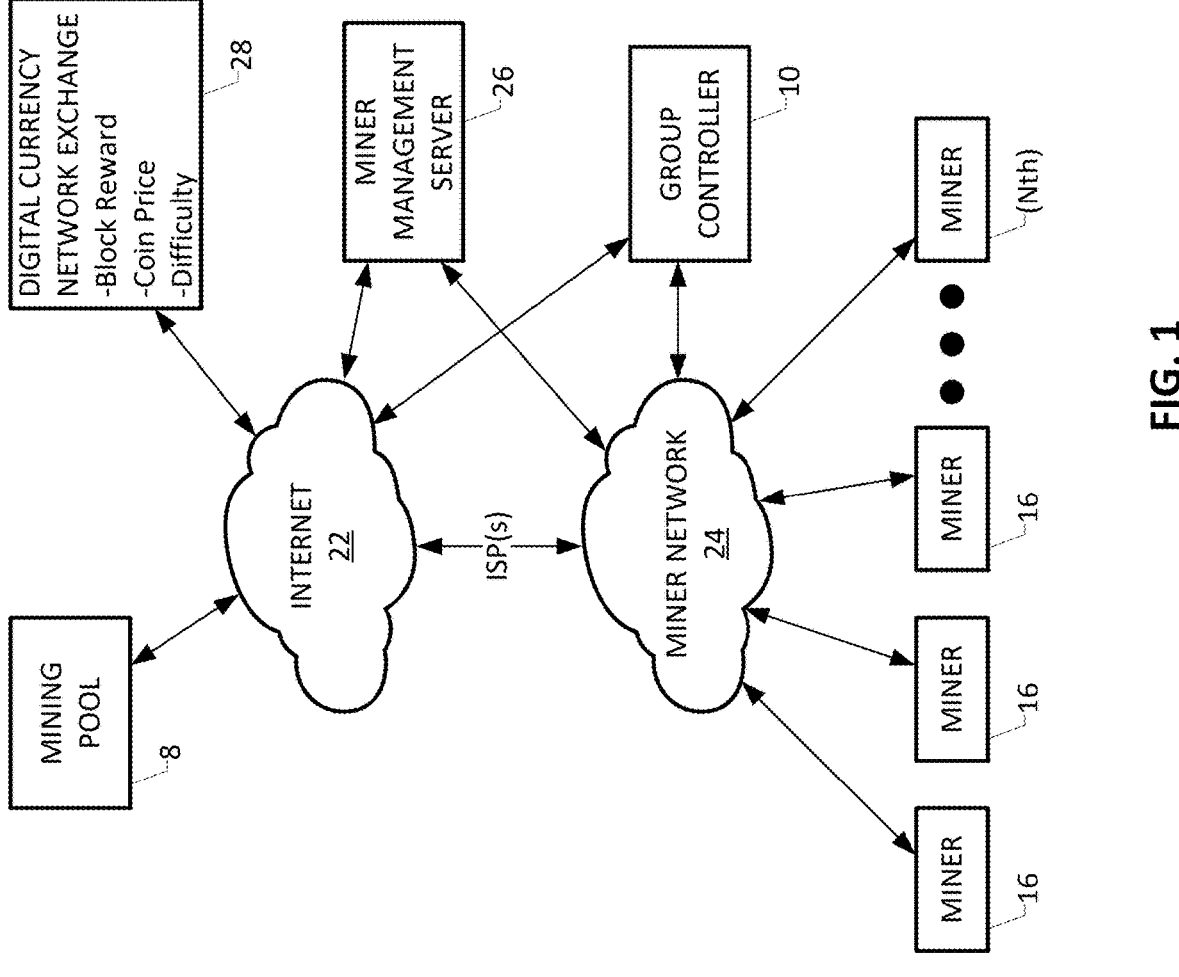
FIG. 1 illustrates a simplified schematic representation of a cryptocurrency system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

A. DEFINITIONS AND INTERPRETATIONS

Reference is made in detail to various exemplary embodiments. Each example is provided by way of explanation and is not meant as a limitation and does not constitute a definition of all possible embodiments. It is understood that reference to a particular "exemplary embodiment" of, e.g., a structure, assembly, component, configuration, method, etc. includes exemplary embodiments of, e.g., the associated features, subcomponents, method steps, etc. forming a part of the "exemplary embodiment".

The following detailed description is merely exemplary in nature and is not intended to limit the described embodiments or the application and uses of the described embodiments. As used herein, the word "exemplary" or "illustrative" means "serving as an example, instance, or illustration". Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not limiting, unless the claims expressly state otherwise.

For purposes of this disclosure, the phrases "devices," "systems," and "methods" may be used either individually or in any combination referring without limitation to disclosed components, grouping, arrangements, steps, functions, or processes.

In the following detailed description, numerous specific details are set forth by way of examples in order to provide a thorough understanding of the relevant teachings. These examples are illustrative and not exhaustive. It should be apparent to those skilled in the art that the scope of the teachings is not limited to these specific details. Additionally or alternatively, well-known methods, procedures, components, and/or circuitry have been described at a relatively high-level, without detail, in order to avoid unnecessarily obscuring aspects of the present disclosure.

While this disclosure includes several embodiments, there is shown in the drawings and will herein be described in detail certain embodiments with the understanding that the present disclosure is to be considered as an exemplification of the principles of the disclosed methods and systems and is not intended to limit the broad aspects of the disclosed concepts to the embodiments illustrated. As will be realized, the disclosed methods and systems are capable of other and different configurations, and one or more details are capable of being modified, all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or methods may be performed in a different order. Accordingly, the drawings, flow charts and detailed description are to be regarded as illustrative in nature, not restrictive or limiting.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding.

It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

When terms of degree such as "generally," "substantially," and "about" are used herein in connection with a numerical value or a qualitative term susceptible to a numerical measurement, it is contemplated that an amount that is plus or minus 10 percent, and possibly up to plus or minus 20 percent, of the numerical value, is covered by such language, unless specifically noted otherwise, to at least account for manufacturing tolerances. Otherwise, a suitable definition for "generally," "substantially," and "about" is largely, but not necessarily wholly, the term specified.

In reading the claims it is intended that when words such as "a," "an," "at least one," "at least a portion" are used there is no intention to limit the claim to only one item unless specifically stated to the contrary in the claim. When the language "at least a portion" and/or "a portion" is used, the item can include a portion and/or the entire item unless specifically stated to the contrary.

Although selected networking, mining, and software terminology is used to describe features, functionality, and/or capability related to the field, it should be understood that said terminology may not directly correspond to the exact same features as implemented herein.

Cryptocurrency, or digital currency, as used herein refers to digital or virtual currency mined via blockchain operations, including but not limited to, Bitcoin, Litecoin, Dogecoin, Ethereum, Ripple, Omni, Stellar, NEO, Cardano, and alternative coins.

B. INTRODUCTION

The disclosures herein relate to, among other things, cryptocurrency mining systems and miner machines, and in some embodiments, to at least systems, methods, and/or instructions, where the instructions are in non-transitory computer-readable storage mediums for sensing a loss of work for miner machines, such as a loss of connectivity with a remote mining pool or other remote source from which a group of miners individually get their next jobs, and upon sensing that loss of work, taking steps to maintain and/or gradually ramp down power consumption by the group of miners to avoid rapid drops in power consumption by the group of miners.

Various embodiments described herein provide individual local miner controllers that detect work loss, generate substitute jobs, and execute power ramping profiles. The embodiments described herein also provide, alternatively or additionally, a group controller configured to coordinate a group of miners, provide and enact profiles, policies, and parameters, distribute local work, and manage group-wide sequences. The embodiments described herein also provide steps for detecting work loss, operating in a group holdover state, group power down state, and group power up state. The embodiments described herein also provide non-transitory computer readable medium including instructions, or code for implementing the logic above. The embodiments described herein also provide granular controls including policy rules (e.g., different behaviors for brief vs. prolonged outages, consideration of ambient and/or weather conditions, and consideration of other parameters such as profitability and grid condition).

Power control under the disclosures herein can be implemented as fully centralized via miner power management software on a group controller or other non-miner computing devices, fully decentralized via individual power control firmware installed on each miner in a group of miners, or a hybrid scheme in which power control firmware on each miner interacts, or can interact, with miner power management software on a group controller or other non-miner computing device.

The disclosure and embodiments described herein provide grid-friendly power management for large mining datacenters, transforming mining fleets into cooperative, grid-friendly loads rather than large-load liabilities. The embodiments described herein also mitigate thermal, mechanical, and electrical stress for power changes at each miner. The embodiments described herein give operators verifiable control over outage behavior.

C. SYSTEMS AND DEVICES

FIG. 1 illustrates a simplified schematic representation of a cryptocurrency mining system. One or more group controllers 10 are used to manage and/or control the operation of a group of miners 16 over one or more communication networks. The group of individual miners 16 is illustrated in FIG. 1 as multiple individual miners 16 extending through an Nth number of miners 16. A typical cryptocurrency mining site will operate with quantities of 100+, 1000+, or 10000+ individual miners 16 in a group. In one embodiment, the group controller 10 may communicate with the miners 16 locally through a miner network 24 (e.g., a local area network) connecting both the group controller 10 and the group of miners 16. In other embodiments, the group controller 10 may communicate with the miners 16 remotely over the Internet 22 and then through the miner network 24, or may communicate directly with the miners 16. Group controller 10 interacts with specialized power control firmware 100 hosted on (i.e. locally installed on) each miner 16 that includes instructions, programs, and/or computer code stored in a transitory or non-transitory computer readable medium to control and/or manage the desired power consumption of the miners and other aspects and methodologies of the present disclosure. Group controller 10 may take the form of a specialized computing device, such as programmable logic controller, or may take the form of a non-specialized computing device, such as a personal computer or mobile computing device (e.g., a smart phone or tablet).

Specialized miner power management software may be hosted on, and/or accessible by, group controller 10 for interfacing with and communicating with each miner 16, and for managing and/or controlling the power consumption of each miner. In one embodiment, the miner power management software is hosted on the group controller 10 as an application. In another embodiment, the miner power management software is hosted on a network server or a cloud-based system, for example miner management server 26, and the group controller 10 has access to, for example via a web browser or terminal services, the remotely hosted miner power management software. In another embodiment, the miner power management software is hosted at least partially on the group controller 10 as, for example, an application, and some functionality of the miner power management software is hosted remotely, such as on a network server or cloud-based system, which is accessed and/or utilized via the application. The miner power management software may include all necessary tools, whether local, web-based, or remote, and protocols for interfacing with users and the power control firmware.

FIG. 1 further illustrates one or more servers 26 for managing, storing and sharing, performing computer computations or processes, hosting software and/or copies of firmware, maintaining data indexes, managing machine learning models/algorithms, managing artificial intelligence (AI) processes, and accessing, retrieving, and transmitting data and information provided by third-party service networks. It is appreciated that server 26 may include a cloud-based services system or network that is managed by a third-party entity or company. The server 26, depending on location and communication connections, may communicate via the miner network 24 and/or the Internet 22.

In one embodiment, server 26 may host miner power management software, or portions or modules thereof, accessible by the group controller 10 and/or the miners 16. In another embodiment, server 26 may act as a group controller 10. In another embodiment, server 26 may include, and/or have access to, one or more databases, similar to or the same as database 55 described below with respect to group controller 10.

In another embodiment, server 26 may communicate with a digital currency exchange network 28 to access, retrieve, and transmit data and information associated with mining digital currency such as profit variables including, but not limited to, block rewards, digital coin prices, electricity price, a derivative coin price, and difficulty. These profit variables may be accessed, retrieved, and transmitted at a predetermined interval to, for example, the group controller 10 and/or to the miners 16.

Systems and methods for controlling the power of miners 16 may be implemented in FIG. 1 as unified or distributed systems using one or more computing devices as group controller 10 and/or one or more computing devices as miner management server 26 and may be implemented as part of a single software or software/hardware system, or alternatively, may be partitioned in any suitable fashion into a number of distinct modules, procedures or other functional portions.

FIG. 1 further illustrates one or more mining pools 8. A mining pool 8 operates to pool the work of large quantities of miners, typically across multiple geographic regions and frequently among multiple different mining operators. All the miners in a pool work towards finding (i.e., solving) the next block in a blockchain. When a pool-participating miner solves a hash problem, which may be only a partial contribution towards the ultimate block-solving hash, the miner sends its solution as individual proof of work, referred to as a share, to the pool. The pool then sends back to the miner an acknowledgement that its share was received. The miner then immediately starts on its next hashing problem, which may be received from the pool or directly determined from the blockchain. If the pool successfully finds the next block and receives the financial reward for finding the block (typically in the form of the blockchain's cryptocurrency), then each miner is generally awarded a percentage of the reward based on the share submissions of each individual miner compared to the overall work performed by the pool.

In the example illustrated in FIG. 1, each miner 16 may participate in at least one mining pool 8. One or more of those miners 16 may also have the ability to participate in other mining pools as well. In some embodiments, at least one miner 16 does not participate in a mining pool. Rather, in such an embodiment, the miner 16 receives hashing problems directly from an Internet source and sends its solution back to the Internet source, which in turn, sends back to the miner an acknowledgement that its share was received.

As further represented in FIG. 1, miner network 24 and the Internet 22 are communication networks that provide electronic communication between and among miners 16, group controller 10, miner management server 26, mining pool 8, and/or digital currency exchange 28, among other potential connected devices and systems. In alternative embodiments, one or more of the miners 16, group controller 10, miner management server 26, mining pool 8, and/or digital currency exchange 28 communicate without the assistance of the miner network 24. Miner network 24 may include one or more wired or wireless communication private networks including, as examples only, a LAN (local area network) or WLAN (wireless local area network) using common or proprietary protocols. The Internet 22 is a commonly understood network by a person of ordinary skill and is generally accessed as a WAN (wide area network) via various common means. The miner network 24 and the Internet 22 communication networks may include a variety of communication or information exchange components or peripherals, including, but not limited to, one or more base stations, proxy servers, routers, switches, repeaters, Ethernet hubs, wired or wireless data pathways, or modems, that are configured to direct and/or deliver data and/or information.

In the illustrated example of FIG. 1, miners 16 rely on the Internet 22 communications network for their communication with, among other things, the one or more mining pools 8. It is understood that miners 16 communicate to and through the Internet 22 via their connected miner network 24 (e.g., a LAN). It is also understood that while group controller 10 and miner management server 26 may have direct connections to the miner network 24 and their own independent connections to the Internet 22, they do not act, and likely could not act, as proxies for Internet communications for a common-size group of miners 16 (e.g., one hundred, one thousand, or ten thousand or more miners 16).

In the example illustrated in FIG. 1, it is further understood that the miner network 24 may occasionally or even frequently, lose connectivity to the Internet, particularly in less developed areas of the world, but also occasionally in developed areas of the world. Generally, one or more internet service providers (ISPs) are contracted to provide connectivity between the miner network 24 and the Internet 22. For example, a mining site with a group of miners 16 may have a wired internet connection via a first ISP between the miner network 24 and the Internet 22 and may also have a backup high-bandwidth cellular or satellite internet connection via a second ISP between the miner network 24 and the Internet 22. However, even with redundant connections and/or ISPs, network connectivity between the miners 16 and the rest of the world (via the Internet) may fail for a variety of reasons. For example, the ISP(s) may lose their Internet access and be unable to provide Internet connectivity to the miner network 24. As another example, bad weather and/or damaged network paths may prevent the miner network 24 from connecting with the Internet 22. As another example, the local miner network 24 may fail, preventing the miners from not only communicating with the mining pool 8 and the rest of the outside world, but also from communicating with a group controller 10 that is directly connected to the miner network 24. Thus, while it is advantageous to provide miner power management control via a group controller 10 connected over the miner network 24, there are further advantages to providing miner power management control, additionally or alternatively, through power control firmware stored locally on each miner 16. Alternatively or additionally, there are other advantages to providing miner power management through management software stored either locally in another computing device on the local network or in a cloud-based device or service.

Figure 2:
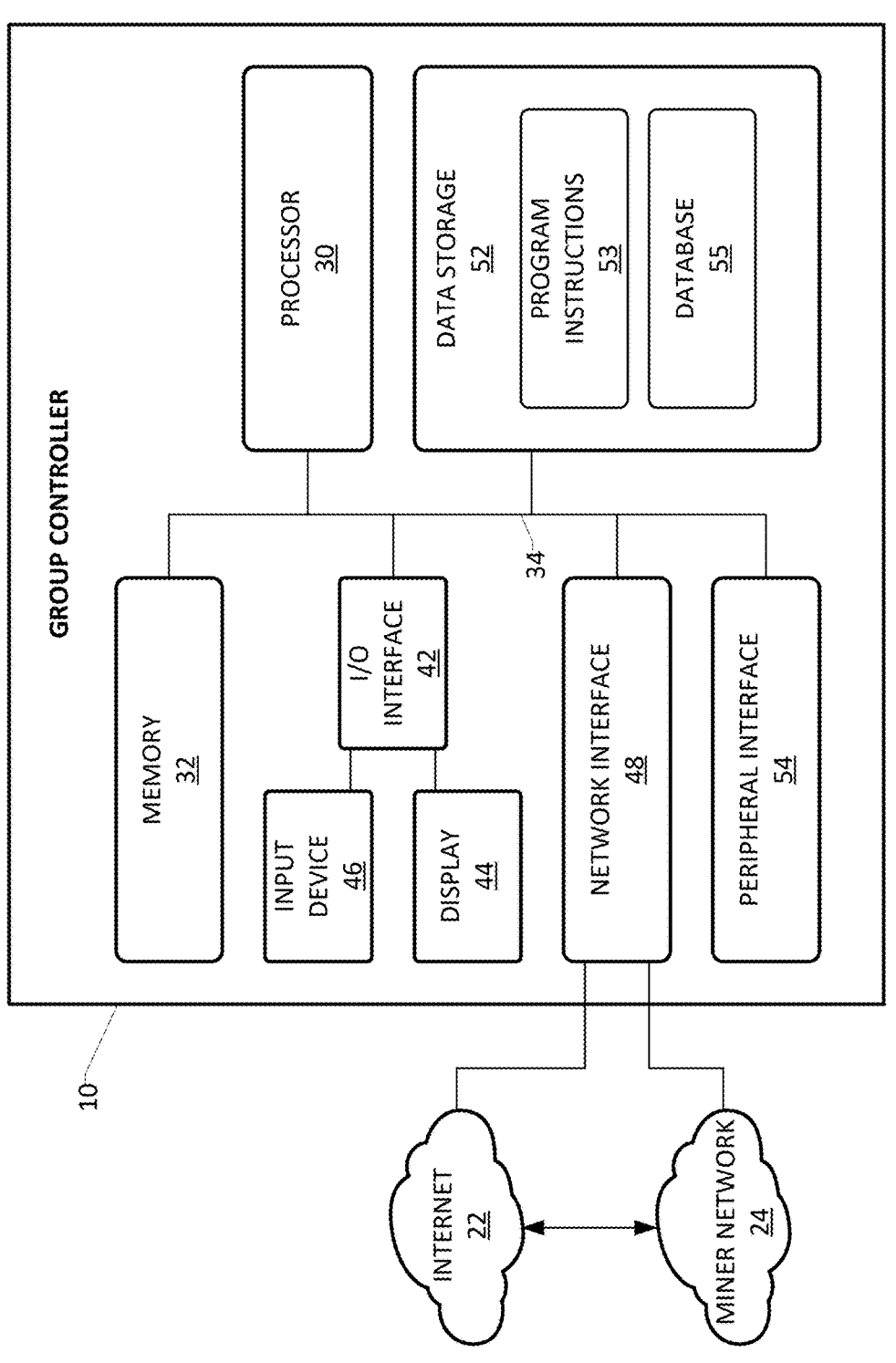
FIG. 2 illustrates a simplified schematic block diagram of a group controller.

FIG. 2 next illustrates a simplified schematic block diagram of a group controller 10 used in controlling and/or managing a large group of miners 16 either over the Internet 22 via the miner network 24 (e.g., remotely) or directly over the miner network 24 (e.g., locally). Group controller 10 includes a processor 30, memory 32, and data storage 52 for hosting and executing miner power management software for updating, controlling, and/or managing a group of miners 16, where the miner power management software is provided in a computer-readable medium and processed as machine-executable program instructions 53 including computer code, computer application programs, and/or software. The miner power management software includes power management functionality and preferably is able to communicate with power control firmware 100 installed on each miner 16.

Memory 32 communicates with processor 30 and other components via an electrical communication bus 34. Examples of memory 32 may include static random-access memory (SRAM), synchronous dynamic RAM (SDRAM), nonvolatile/flash-type memory, machine-readable media, read only component, or any combination thereof. In one exemplary embodiment, memory 32 may include machine-executable instructions, programs, or applications embodying machine learning models, algorithms, and/or a hierarchical storage manager that works cooperatively with the power control firmware 100 installed in each miner 16.

Each group controller 10 may include an I/O interface 42 communicatively coupled to bus 34 for accommodating communication with a display monitor 44 and one or more input devices 46. Display monitor 44 may be remotely located from, and electrically coupled to, group controller 10. Examples of input devices 46 may include a keyboard, a touchpad, an electronic mouse, an audio input device, or a touch screen. A network interface 48 is provided to communicate with the miner network 24 and/or the Internet 22. The network interface 48 may include one or more network interface cards including for example, an Ethernet network interface card, a wireless network interface card, or one or more wired or wireless modems. Group controller 10 may include a storage device 52 that includes a hard disk drive, a magnetic disk drive, an optical disc drive, a solid-state memory device, memory dongle, magnetic storage media, or any combination thereof. Storage device 52 can include an external storage device, such as a removable disk drive, memory stick, or flash drive that is removably attachable to group controller 10 via a communication port in peripheral interface 54. In one example, storage device 52 and memory 32 may provide volatile, and/or non-volatile storage of machine-readable instructions, data structure, program modules associated with machine learning models/algorithms, and a hierarchical storage manager. There is provided a peripheral interface 54 for accommodating peripheral input and/or output devices including serial or parallel port connections, USB or HDMI connections, or other compatible communication and electrical connections associated with peripheral devices.

In one embodiment, group controller 10 includes, or has access to, one or more database(s) 55 for hosting, storing, and managing information, instructions, code, look-up tables, data files, applications, machine learning models/algorithms, hierarchical storage manager, data index tables, processing data, and other materials associated with controlling and managing miners 16. Each database 55 may be configured as a relational database that includes one or more tables of rows and columns that can be searched or queried according to a particular query language, such as a version of Structured Query Language (SQL). Alternatively or additionally, one or more databases 55 may be configured as a structured data store that includes data records formatted according to a markup language, such as a version of extensible Markup Language (XML). In other embodiments, one or more databases 55 may be implemented using one or more arbitrarily or minimally structured data files managed and accessible through any suitable type of application.

Figure 3:
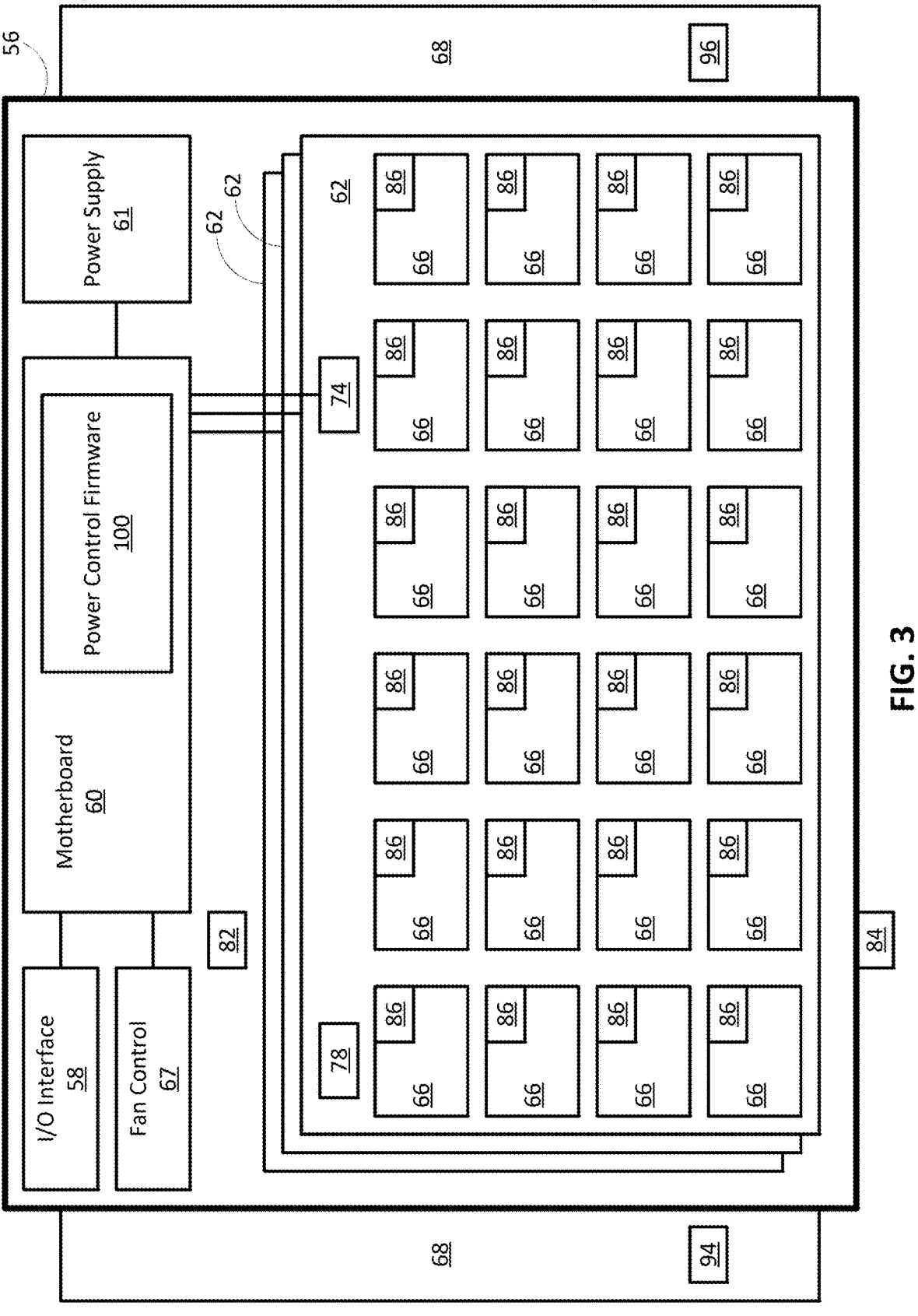
FIG. 3 illustrates a simplified schematic representation of a miner.

FIG. 3 next illustrates a simplified schematic representation of certain operating components of a miner 16. In one exemplary embodiment, each miner 16 in a group is identical. In another exemplary embodiment, one or more of miners 16 in a group are different from other miners 16 in the group, but they all have similar components and function similarly for purposes herein. For example, various miners 16 in a group may be different brands or models, and may require slightly different power control firmware 100, but the power control firmware 100 provides similar or identical functionality in each miner 16.

Miner 16 includes an input/output (I/O) interface card 58 for electronically communicating with other devices via a communication network such as the miner network 24. In other embodiments, the I/O interface card may alternatively or additionally be configured for direct connections to other networks or devices. Also included in miner 16 is a motherboard 60 that includes a processor, memory, and at least a limited storage for hosting the power control firmware 100. Further included in miner 16 are typically a plurality of hash boards 62, each with a plurality of mining chips 66, a power supply 61 for powering the miner 16, and a cooling module, for example a pair of fans 68, to draw heat away from electronic components, particularly the mining chips. In one alternative embodiment, the cooling module may employ a liquid, or gas cooling system that employs nitrogen, water, or other cooling agent to cool the mining chips 66. Power supply 61 may include all necessary electronic circuitry and components (including, for example, step-down transformers, voltage regulators, filters, fuses, and other electronics) for managing input power and for generating and delivering a regulated, voltage supply to electronic components. Supply voltage measuring circuitry may be included in miner 16 to measure power and/or voltage delivered from the power supply 61, including in real time during normal operation and also during a start-up chip voltage phase when powering up integrated circuit chips. Such circuitry may also assist in providing warnings when power supply 61 is not functioning properly.

The I/O interface 58, motherboard 60, and power supply 61 can be enclosed within a housing 56, or alternatively housed separately. Each hash board 62 generally includes a number of mining chips 66 that are particularly designed for mining digital currency. It is appreciated that both the number of hash boards 62 and mining chips 66 shown in FIG. 3 are for illustrative purposes only and that each miner 16 may include more or fewer hash boards 62, each having more or fewer mining chips 66. Each hash board 62 generally includes a PIC (peripheral interface controller) 74 for communications between the motherboard 60 and the respective mining chips 66.

In the preferred embodiment, each mining chip 66 includes an application-specific integrated circuit (ASIC) chip that includes, for example, an SHA-256 algorithm for mining a specific digital currency. For cryptocurrency mining, ASIC chips generally provide smaller volume, lower power consumption, and enhanced reliability compared to other integrated circuit chips. In one alternative embodiment, ASIC chips 66 may be replaced with field programmable gate array chips (FPGA), or graphic processing unit chips (GPU), or any combination thereof.

Certain parameters may impact the functionality and operating efficiency of miner 16. For example, high operating temperatures may compromise the operating performance of ASIC chips 66 and/or hash boards 62, potentially causing damage if not managed properly. Each miner 16 may include a variety of sensors for continuously monitoring the temperature of mining chips 66, the temperature of hash boards 62, the rotational direction and/or speed of fans 68, the internal temperature within housing 56, the environmental temperature, and/or humidity, each in real-time.

In one embodiment, board temperature sensors 78 are provided on each respective hash board 62, and an inner housing temperature sensor 82 is also provided within the inner cavity of housing 56 to measure the internal temperature of miner 16. An environment temperature sensor 84 may be affixed to or near an external surface of miner 16 for measuring environmental temperature in which the miner 16 operates. On-chip temperature sensors 86 are also generally provided to measure the temperature of each miner chip 66 at start-up and during normal operation. Each on-chip temperature sensor 86 may include miniature thermocouples, resistance temperature detectors, thermistors, or other semiconductor based integrated circuits. It is appreciated that any number of temperature sensors can be implemented to measure various temperatures, or other characteristics such as humidity, associated with miner 16.

Fan sensors 94 may communicate with a fan control module 67 that is in communication with motherboard 60. The fan control module 67 may include pulse width modification capability and measuring circuitry. The fan control module 67 may monitor, measure, and dynamically control the speed of fans 68 to help manage the temperature of miner chips 66 and/or hash boards 62 to prevent damage and overheating. Sensors 78, 82, 84, 86, 94, 96 may all be in communication with motherboard 60 to aid in managing control of fans 68 via fan control module 67.

D. USER INTERFACE OVERVIEW

To implement grid-friendly miner power management for a group of miners 16 as contemplated herein, a power control profile can be configured by a user and deployed across the miners 16 via the power control firmware 100 on each miner and/or the miner power management software hosted on, and/or accessible by, group controller 10 and/or a server such as miner management server 26.

FIGS. 6-9 illustrate example user interfaces for power control profile configuration for a group of miners 16. Each of FIGS. 6-9 illustrates a graphical user interface of a dashboard 400 with function tabs 500, 600, 700, 800 that are presented via a display screen to a user. Each function tab 500, 600, 700, 800, when selected by a user, displays a configuration page that provides user interface elements such as buttons, fields, and dropdown boxes. The user interface elements on each configuration page are arranged into logical sections by functionality, allowing a user to configure aspects of the power control profile. A user element SAVE button is provided on the dashboard 400 to save the current power control profile configuration settings. A user element DEPLOY button is provided on the dashboard to deploy the power control profile. As necessitated by the configuration options selected prior to deployment, deployment may include one or more of the following: creating or updating stored copies of power control firmware 100 for the miners 16 in the group, deploying the revised power control firmware 100 to the miners 16 such that it is installed in the miners 16, creating or updating configuration data for the miner power management software, and/or deploying the revised miner power management software to the appropriate computing device(s), e.g., the group control 10, such that it is installed on the computing device(s).

Each of FIGS. 6-9 are further described below with respect to corresponding descriptions of exemplary power control profile configuration options.

E. DETECTING LOSS OF WORK

In order to implement grid-friendly miner power management for a group of miners 16 as contemplated herein, it helpful to have methods for detecting a loss of work for the group of miners 16. This is because a loss of work normally causes the group of miners 16 to stop hashing, and the hashing by the miner chips 66 is the vast majority (e.g. 95%+) of the group of miners' 16 power consumption during normal operating conditions. Standard firmware and power management control schemes provide no provision for keeping the group of miners 16 operating at a managed power consumption level during loss of work, at least because it is counter-intuitive to do so. Miners 16 are operated as profit-producing devices, balancing the cost of energy consumed with the profit from receiving financial rewards for producing valid work, for example for pools 8. If the group of miners 16 cannot receive work from, and send proof of valid work to, pools 8, then they cannot receive a financial reward and it becomes vastly unprofitable for the miners 16 to consume power during a time when loss of work has occurred. However, it is beneficial for the purpose of creating grid-friendly mining sites to detect loss of work to the group of miners 16 so that grid-friendly power management steps can be implemented to maintain power consumption by the group of miners 16 when loss of work occurs, even if that power management causes the miners 16 to consume power without providing rewarded work.

In one embodiment, a group of miners 16 may be connected to only a single pool 8. The group of miners 16 may experience loss of work because the pool 8 stops responding. In another embodiment, a group of miners 16 may be connected to, or have the availability to connect to, multiple pools 8. This is sometimes arranged for redundancy and/or profitability. In each embodiment, however, the group of miners 16 may still experience loss of work. For example, the single pool 8 or the multiple pools 8 may all become non-functional. In another example, the connection(s) between the pool 8 (or multiples pools 8) and the Internet 22 may fail. In another example, the connection between the miners 16 in the group and the pool 8 (or multiple pools 8) may lose connectivity. In another example, the connection between the miners 16 in the group and a remote mining pool proxy from which the miners get work from the pool 8 (or multiple pools 8) may lose connectivity. In another example, the connection between the pool 8 (or multiple pools 8) and a remote mining pool proxy from which the miners get work from the pool 8 (or multiple pools 8) may lose connectivity.

As non-limiting illustrative examples, the connection(s) between the miner network 24 and the Internet 22 may fail, the miner network 24 may fail, the connections between the group of miners 24 and the miner network 24 may fail, and/or a mining pool proxy may fail. In each case, the group of miners 16 will collectively experience loss of work across the group within a very short time, with minor variations depending on how far along each miner 16 is in its hashing solution progress and therefore the need for its next individual communication. To put it in perspective with a specific quantitative example, the average time between block solutions on the Bitcoin network is currently about 10 minutes. If the group of miners 16 comprise 100 MW of power consumption during normal operation, which is a common cryptocurrency mining site size, and a loss of work occurs across the full group of miners, then, without the miner power management contemplated herein, the connected power grid could see an unexpected, and potentially damaging, load drop of potentially 95 MW or more in under 10 minutes.

Various methods for detecting loss of work for the group of miners 16 are described below. In one embodiment, once a miner 16 in the group or another device, such as a group controller for the group, determines that a loss of work has occurred, that determination is communicated to all the miners 16 in the group and/or to the group controller 10. Alternatively or additionally, each miner 16 in the group individually monitors for loss of work and acts responsively when it has determined a loss of work has occurred.

Additionally, example configuration options are illustrated in FIG. 6 for setting options and implementing the methods via a power control profile deployed via firmware on miners 16 and/or miner power management software on other computing devices. In the example dashboard 400, configuration options for detecting loss of work (and restored availability of work) are shown as a LOSS OF WORK page displayed to a user when the user has selected function tab 500 on the dashboard. Example configuration options for each method occupy dedicated sections 502, 504, 506, 508, 550 of the page, organized by section titles for the individual methods.

a. Internet Connectivity

One method of detecting loss of work is to continuously ping an Internet-connected device and/or listen to heartbeat pings from an Internet-connected device. A successful ping includes receipt of a ping acknowledgment following a sent ping or receipt of a heartbeat ping. A failed ping includes no receipt of an expected ping acknowledgment following a sent ping or no receipt of a heartbeat ping.

In one embodiment, each miner 16 can execute instructions included in the miner's power control firmware 100 to ping and/or listen for heartbeat pings, each across the Internet 22. The pings can be with a device on the Internet 22, such as a dedicated public or private ping monitor or an ISP device. In one embodiment, if the miner 16 does not receive a successful ping, then the power control firmware 100 can assume a loss of connectivity to Internet 22, and thus a loss of work from the one or more pools 8, and responsively execute power control actions according to instructions in its power control firmware 100. Alternatively, the power control firmware 100 may require a threshold quantity of failed pings before assuming loss of work and executing power control actions. For example, the threshold quantity could be either or both: (i) a quantity of failed pings or a length of time after a successful ping without a subsequent successful ping.

In another embodiment, in order to reduce ping traffic on the Internet 22, one or more miners 16 in the group may have instructions in their respective power control firmware 100 to, over the Internet 22, send a ping or listen to a heartbeat ping at a scheduled or randomized time. When such a miner 16 receives a successful ping, that miner 16 may then broadcast that success to all other miners 16 in the group on the miner network 24—in effect notifying the other miners 16 in the group that there is no loss connectivity to the one or more pools 8. Alternatively or additionally, when such a miner 16 experiences a failed ping, then either immediately at that time, or alternatively only after reaching the above discussed threshold quantity, the miner 16 may broadcast the failure to all other miners 16 in the group on the miner network 24—in effect notifying the other miners 16 in the group that there is a loss of connectivity to the one or more pools 8 and therefore loss of work. Upon the notice of failure, the power control firmware 100 on each miner 16 can assume a loss of Internet 22 connectivity, and thus a loss of work from the one or more pools 8, and responsively execute power control actions according to instructions in its power control firmware 100.

In another embodiment, the group controller 10 can execute instructions included in the group controller's miner power management software to ping and/or listen for heartbeat pings in the same fashion as described above for the miners 16. Likewise, the group controller can then notify the miners 16 in the group over the miner network 24 of successful and/or failed pings. Upon notice of failed pings, the power control firmware 100 on each notified miner 16 can assume a loss of Internet 22 connectivity, and thus a loss of work from the one or more pools 8, and responsively execute power control actions according to instructions in its power control firmware 100.

To detect when work becomes available again to the miners 16, the process can continue the same as described, except the miners 16 and/or the group controller 10, depending on the configured method of detection, will respond to a successful ping, or notice thereof, either immediately or after a threshold quantity is reached according to the desired configuration, by notifying other miners 16. The miners 16 and/or the group control 10 will then responsively execute power control actions according to instructions in the miners 16 power control firmware 100 and/or group controller's 10 miner power management software as appropriate to the configuration. Such instructions may include requesting new work and commencing normal hashing. For example, in one embodiment, upon notice of a successful ping following loss of Internet 22 connectivity, the power control firmware 100 on each miner 16 may assume work is again available from the one or more pools 8 and responsively execute power control actions according to instructions in its power control firmware 100.

b. Pool Connectivity

Another method of detecting loss of work is to continuously ping, or listen to heartbeat pings from, the one more pools 8. This is substantially similar to the Internet 22 pings or Internet 22 heartbeat pings embodiments described above, except the pings are with the pool(s) 8 instead. As with Internet 22 pings, a successful ping includes receipt of a ping acknowledgment following a sent ping or receipt of a heartbeat ping and a failed ping includes no receipt of an expected ping acknowledgment following a sent ping or no receipt of a heartbeat ping. Beneficially, many pools 8 already provide heartbeat pings in the form of Stratum heartbeat pings.

As an illustrative example, substantially as described above with respect to Internet 22 pings, each miner 16 can execute instructions included in the miner's power control firmware 100 to ping and/or listen for heartbeat pings, except with the pool(s) 8 instead of the Internet 22. Likewise, substantially as described above with respect to Internet 22 pings, the group controller 10 can execute instructions included in the group controller's miner power management software to ping and/or listen for heartbeat pings, except with the pool(s) 8 instead of the Internet 22. Also as described above, the miners 16 and/or the group controller 10 can notify the other miners 16 in the group of successes or failures, either immediately or after a threshold quantity is reached. Also as described above, upon notice of failed pool(s) 8 connectivity, the power control firmware 100 on each notified miner 16 can assume a loss of work from the pool(s) 8, and responsively execute power control actions according to instructions in its power control firmware 100. Other embodiments described above with respect to Internet 22 pings are equally applicable to pool 8 pings.

To detect when work becomes available again to the miners 16, the process can continue the same as described above with respect to Internet 22 pings, except the miners 16 and/or the group controller 10 will respond to a successful pool 8 ping acknowledgement or receipt of a pool 8 heartbeat ping, or notice thereof, optionally immediately or after a threshold quantity is reached according to the desired configuration, by notifying other miners 16 depending on the configured method of detection, and responsively execute power control actions according to instructions in their power control firmware 100 and/or group controller's 10 miner power management software as appropriate to the configuration. Such instructions may include requesting new work and commencing normal hashing.

c. Share Submission Failure

Another method of detecting loss of work is to monitor share-submission failures. If a miner 16 in the group is unable to successfully submit its proof of work to a pool 8, then the miner's power control firmware 100 may determine a loss of work from the pool 8 exists, and, if no other pools 8 are available to the miner 16, the miner 16 can responsively execute power control actions according to instructions in its power control firmware 100.

As an example, once a miner 16 solves a valid share, it may submit, for example, a mining.submit message to the pool 8. If the miner 16 does not receive a successful acknowledgement to the submission, either immediately or after a threshold quantity of submission attempts, the miner 16 may attempt to register with another pool 8 to get work. If no other pools 8 are available, either because none are registered in the miner's power control firmware 100 or because none are available, the miner 16 can determine that a loss of work condition exists and responsively execute power control actions according to instructions in its power control firmware 100.

As described above with respect to other loss of work detection methods, one or more miners 16 can notify the other miners 16 in the group of a share submission failure(s), either immediately or after a threshold quantity is reached. Substantially similarly or identically as described above, upon notice of failed share submission(s), the power control firmware 100 on each notified miner 16 can determine a loss of work exists and responsively execute power control actions according to instructions in its power control firmware 100.

To detect when work becomes available again to the miners 16, one, some, or all of the miners 16 can be configured to continue to attempt to submit proof of work to the pool 8. Upon successful submission (e.g., confirmation that a submission is received, even if the submitted proof of work is outdated and not valid for consideration as a valid share for reward purposes), of proof of work by one or miners 16, the miner(s) 16 notify the other miners 16 and/or the group controller 10, depending on the configured method of detection. Upon determination or notice of the restored availability of work, the miners 16 and/or the group controller 10 responsively execute power control actions according to instructions in their power control firmware 100 and/or miner power management software as appropriate to the configuration. Such instructions may include requesting new work and commencing normal hashing.

d. Get Work Failure

Another method of detecting loss of work is to monitor get-work failures. If a miner 16 in the group is unable to successfully obtain work data from a pool 8, then the miner's power control firmware 100 may determine a loss of work from the pool 8 exists, and, if no other pools 8 are available to the miner 16, the miner 16 will responsively execute power control actions according to instructions in its power control firmware 100.

As an example, once a miner 16 successfully submits a valid share, receives notification that a block is solved, or otherwise needs to obtain its next work, it may request new work from the pool 8, e.g., via a getwork, getblocktemplate, or similar message to the pool 8. If the miner 16 does not receive a valid response to the work request, either immediately or after a threshold quantity of request attempts, the miner 16 may attempt to register with another pool 8 to get work. If no other pools 8 are available, either because none are registered in the miner's power control firmware 100 or because none are available, the miner 16 can determine that a loss of work condition exists and responsively execute power control actions according to instructions in its power control firmware 100.

As described above with respect to other loss of work detection methods, a miner 16, or miners 16 can notify the other miners 16 in the group of get work failure(s), either immediately or after a threshold quantity is reached. The miner 16 can notify the other miners in the group either directly via broadcasting the notice over, e.g. the miner network 24 or by notifying the group controller 10 which will then responsively notify the other miners 16 in the group. Substantially similarly or identically as described above, upon notice of get work failure(s), the power control firmware 100 on each notified miner 16 will determine a loss of work exists, and responsively execute power control actions according to instructions in its power control firmware 100.

To detect when work becomes available again to the miners 16, one, some, or all of the miners 16 can be configured to continue to attempt to request new work from the pool 8. Upon successful obtainment of new work, the successful miner 16 or miners 16 notify the other miners 16 in the group, either directly or via the group controller 10 depending on the configured method of detection. The notifying and notified miners 16, and/or the group controller 10, can also execute power control actions according to instructions in their power control firmware 100 and/or group controller's 10 miner power management software as appropriate to the configuration.

e. Group Controller

As previously described above, in some embodiments the group controller 10 can detect loss of work in some cases and notify the miners 16 of the loss of work. The notified miners 16 can then responsively execute instructions according to their local power control firmware 100.

In another embodiment, the group controller 10 can determine a loss of work condition exists for reasons other than loss of connectivity. For example, the group controller 10 may determine a site condition exists that requires the group of miners 16 to undertake power control actions. For example, the group controller 10 may become aware of a site alarm. In some embodiments, the site condition is related to temperature, humidity level, of combination thereof of the facility. For example, the temperature and/or humidity detected at the facility may exceed a predetermined temperature and/or humidity level acceptable for operation of the miners 16. In some embodiments, the site condition is related to overall power at the facility. For example, the power supplied to the facility may not exceed a predetermined level for acceptable operation of the miners 16. In another example, the power usage of the miners 16 may exceed an acceptable amount or power consumption. Upon determining that such a loss of work condition exists, in one embodiment the group controller 10 will notify the miners 16 in the group of the loss of work condition and the miners 16 will responsively execute power control actions according to instructions in their individual power control firmware 100.

In one embodiment, the group controller 10 can provide differing notices based on the reason for the loss of work, such as one notice for a loss of connectivity and one or more different notices for loss of work related to site conditions.

The miners 16 receiving the notice may then responsively execute differing power control actions depending on the contents of the notice and according to respective instructions in their individual power control firmware 100

In another embodiment, group controller 10 may, alternatively or additionally, have centralized power control over the miners 16 and the group controller 10 will instead send a notice to one or more miners 16, or broadcast a notice to all miners 16 in the group, instructing the notified miners 16 to enact specific power control instructions, which the notified miners 16 will do pursuant to the instructions in the power control firmware 100.

To detect when work becomes available again to the miners 16, the group controller 10 can continue to monitor whether the loss of work condition exists, and upon determination that the condition does not exist, send a notice to one or more miners 16, or broadcast a message to all miners 16 in the group. In one embodiment, the notice may only include information that work availability is restored and the notified miners will respond pursuant to the instructions in the power control firmware 100. In another embodiment, the notice will contain information specific to the event and cause the notified miners 16 to enact specific power control instructions, which the notified miners 16 will do pursuant to the instructions in the power control firmware 100.

f. Loss of Work Profiles

A cryptocurrency mining site operator can configure and enact various profiles for detecting a loss of work for the group of miners 16 at the site. Table 1 below summarizes some, but not all, exemplary information that can be included as loss of work profiles for power control firmware 100 on each miner 16 and/or in software utilized by the group controller 10.

TABLE 1

| Detect Loss of Work | Determination Source | Threshold Value | Detect Loss | Detect Available |
|---|---|---|---|---|
| Internet Ping | Miner/ Group Controller | [qty] | Yes/No | Yes/No |
| Pool Ping | Miner/ Group Controller | [qty] | Yes/No | Yes/No |
| -- Missed ping from all pools | | | Yes/No | Yes/No |
| Share Submission Failure | Miner | [qty] | Yes/No | Yes/No |
| Get Work Failure | Miner | [qty] | Yes/No | Yes/No |
| Group Controller Notification | Group Controller | | Yes/No | Yes/No |

For each loss of work method, the operator can configure a power control profile for the miners 16 in the group by selecting in the power control software whether to activate each individual method, and whether to activate the method for detecting loss of work and and/or detecting whether work availability has been restored. Furthermore, for certain methods (e.g., Internet Ping, Pool Ping), the operator can select the source for detecting the loss of work and select an optionally different source for detecting the return to availability. For example, the operator can activate the Internet Ping method and configure the power control profile such that only the miners 16 make the determination, only the group controller 10 makes the determination, or both the miners 16 and the group controller 10 are permitted to make the determination for either or both loss and return.

Additionally, the operator can configure a power control profile by further selecting one or more threshold values for certain parameters that must be exceeded before a loss of work is determined, and also selecting one or more threshold values for certain parameters that must be exceeded before a return of work is determined. For example, if the operator activates the Internet Ping method in the power control profile, the operator can specify that the threshold value is three unacknowledged pings, four unreceived heartbeat pings, and/or one minute since the last successful ping acknowledgement or received heartbeat ping, or any combination thereof.

Similar steps can be performed by the operator for each method, as relevant. In one embodiment, for the Pool Ping method, the operator can also choose to activate a parameter where the miners 16 and/or group controller 10 must check all available pools 8 before determining a loss of work exists.

Additionally, the operator can configure the power control profile for the group of miners 16 to require that at least two methods have determined a loss of work exists, and only then cause the miners 16 and/or group controller 10, as appropriate to the configuration, to enact specific power control instructions pursuant to the instructions in the power control firmware 100 or miner power management software, as appropriate.

Once the operator completes the loss of work profile portion of the power control profile, the power control software can cause the power control profile to be deployed to (e.g., installed on) the miners 16. For example, the group controller 10 or another device can broadcast the relevant parameters from the configured profile to all the miners 16, and their individually hosted power control firmware 100 can update itself and/or relevant local data storage with the relevant parameters. As another example, the group controller 10 or another device can create new power control firmware 100 with the relevant configured profile parameters and cause the newly created power control firmware 100 to be installed on each miner. As another example, for relevant configured profile parameters that are specific to the group controller 10, the power control software can cause the group controller 10 to be updated with the new parameters.

g. User Interface Example

With reference to FIG. 6, a user may configure power control profile options for determining loss of work and restored availability of work via sections on the relevant page in the dashboard 400 under the function tab 500.

An INTERNET CONNECTIVITY section 502 may be displayed on the LOSS OF WORK page of the user interface 400 after the user has selected the LOSS OF WORK function tab 500. For detecting loss of work and for detecting restored availability of work, section 502 includes user interface OFF/ON buttons for the heartbeat and ping acknowledgement methods. If a method is activated in the power control profile configuration via the respective OFF/ON button, the user can enter a value for the threshold number of failed pings for detecting loss of work and/or the threshold number of successful pings for detecting availability of work, as appropriate for the method. Additionally or alternatively, a user can similarly enter a value for the threshold quantity in time (e.g., in seconds) for the time between failed or successful pings. For each method in section 502, the user can also select the controller for implementing the method. For example, the example user interface in section 502 provides a dropdown box which could allow the user to select miners 16, group controller 10, or both, for each of the activated methods.

As a specific example, a user could activate the method for detecting internet connectivity loss via heartbeat monitoring in a power control profile by selecting ON in the corresponding ON/OFF button, entering a value for the threshold quantity of failed pings as "3," disabling the time element by entering "0," and select "miners" as the controller. Under that scenario, when the power control profile configuration is completed by the user and subsequently deployed, the power control firmware 100 on each miner 16 in the group would be updated to cause each miner 16 in the group to listen for Internet 22 heartbeat pings and act responsively as described above when the miner 16 detects three failed pings. Alternatively, the user could select "group controller" as the controller in the above example, in which case, upon deployment of the power control profile, miner power management software on the group controller 10 would be configured to listen for Internet 22 heartbeat pings and act responsively as described above when the miner detects 3 failed pings. Additionally, the power control firmware 100 on each miner 16 in the group would be configured to listen for loss of work notifications from the group controller 10 and act responsively as described above.

Additionally, as illustrated in section 502, a hysteresis delay value may be entered by the user which sets a minimum time (e.g., in seconds) the power control profile causes the miner 16 to remain in a detection state (e.g., loss of work detected) before the miner can move to a new detection state (e.g., work available detected). This can prevent miners 16 from rapidly flipping between detection states under certain conditions.

A POOL CONNECTIVITY section 504 may be similarly displayed on the LOSS OF WORK page of the user interface 400 after the user has selected the LOSS OF WORK function tab 500. The pool connectivity configuration options are similar to, or the same as, described above with respect to activating specific methods, entering ping and/or time thresholds, selecting controller options, and entering hysteresis values. Additionally included in section 504 is a user interface element for each method that includes a dropdown box for selecting a pools configuration option. For example, the user could select among options that include a single pool for ping monitoring or multiple pools for ping monitoring. The pools configuration option may further provide logical operator options that provide for AND, OR, XOR or similar logical truth comparisons if multiple pools are selected for monitoring.

A SHARE SUBMISSION section 506 may also be similarly displayed on the LOSS OF WORK page of the user interface 400 after the user has selected the LOSS OF WORK function tab 500. The share submission configuration options are similar to, or the same as, described above with respect to selecting controller options and entering hysteresis values. A specific method can be activated, for example, by selecting ON for a primary or secondary pool for share submissions and selecting the corresponding pool in the pool dropdown box. A user interface element is further included for entering a value as a threshold quantity of submission failures for the corresponding method and pool before the state condition is triggered. The use of primary and secondary pools is illustrative only and the options may include only a single (e.g., primary) pool or may include more than two pools.

A GET WORK section 508 may also be similarly displayed on the LOSS OF WORK page of the user interface 400 after the user has selected the LOSS OF WORK function tab 500. The get work configuration options are similar to, or the same as, described above with respect to section 506 for activating methods and pools, selecting pools, selecting controller options and entering hysteresis values. A user interface element is further included for entering a value as a threshold quantity of get work failures for the corresponding method and pool before the state condition is triggered. The use of primary and secondary pools is illustrative only and the options may include only a single (e.g., primary) pool or may include more than two pools.

A GROUP CONTROLLER section 550 may also be similarly displayed on the LOSS OF WORK page of the user interface 400 after the user has selected the LOSS OF WORK function tab 500. The group controller configuration options are similar to, or the same as, described above with respect to entering hysteresis values. A specific method can be activated, for example, by selecting a condition from a condition dropdown box for the method. For example, the user may select from conditions such as site alarm, temperature, humidity, available power, power consumption, etc., as described above. One or more parameters associated with the condition, such as an alarm code, temperature threshold value or range, or humidity threshold value or range may additionally be entered by the user in the condition parameters field and used by the miner power management software to determine whether the activated condition is met. Additionally, a notice type dropdown box or similar user element may be provided that allows the user to select how notice and/or control is provided to the miners 16 in the group, as described above with respect to the group controller. The illustration of two conditions for each method is illustrative only and more or fewer conditions may be available in section 550.

F. OPERATIONAL STATES

The operator can configure the power control profile for the group of miners 16 to cause the miners to enter a new operational state once a loss of work is determined or restored availability of work determined, for example by one or more of the above methods.

a. Normal Operating

A normal operating state is characterized by the miners 16 being connected to a pool 8, successfully retrieving work from the pool 8, hashing the retrieved work, and successfully submitting their proof of work on the retrieved work. This is a standard default state for actively working miners 16 and the miner is generally operating at full rated power during active hashing unless otherwise limited by heat, one or more non-functional miner chips, or other individual constraints.

In an alternative embodiment, miners 16 in the group may not mine for a pool 8 and may instead mine independently of a pool 8. In such case, a normal operating state would similarly be the miners 16 successfully reading the relevant blockchain via a connected node, successfully retrieving work from the blockchain via the node, hashing the retrieved work, and successfully submitting their proof of work and/or solution for the retrieved work.

b. Group Holdover

A group holdover state is characterized by the miners 16 performing substitute work following a loss of work. For substitute work, the miners 16 in the group perform work that results in exercising their mining chips 66 in order to consume power similarly to or the same as if they were performing valid hashing work in a normal state which could result in an award from pool 8. However, when exercising their mining chips 66 using the substitute work the miners 16 are not generating valid hashes that would result in an award from the pool 8. While this is a very expensive and likely unprofitable mode of operation for a cryptocurrency mining site employ a typically large group of miners 16, it is beneficial to the grid that is supplying power to the miners because it avoids a steep drop in load upon loss of work to the group of miners 16.

Various methods for enacting a group holdover operational state are described below. In one embodiment, once a miner 16 determines or becomes aware that a loss of work (or other group holdover triggering event has occurred), the miner 16 then moves to a group holdover state, e.g., in response to commands from power control firmware 100 on the miner 16. Alternatively or additionally, the miner 16 may be instructed to move to the group holdover state by, e.g., another miner 16 and/or the group controller 10.

Example configuration options are illustrated in FIG. 7 for setting options and implementing the group holdover operational state via methods in a power control profile deployed via firmware on miners 16 and/or miner power management software on other computing devices. In the example dashboard 400, configuration options for the group holdover operational state are shown as a HOLDOVER page displayed to a user when the user has selected function tab 600 on the dashboard. Example configuration options occupy dedicated sections 602, 604, 606, 608, 650 of the page, organized by section titles for the individual methods and for the overall group holdover operational state configuration.

i. Last Job Replay

One method of performing substitute work is to cause the miners 16 to continuously loop their last hashing work instead of moving to new hashing work.

In one embodiment, each miner 16 can execute instructions included in the miner's power control firmware 100 to cache header and/or Merkle data of the current, or last job prior to entering a group holdover state, and subsequently use that cached data when entering the group holdover state to continue hashing using the cached data. The miner 16 may additionally or alternatively, sweep fresh nonce and/or extra nonce ranges as a source of substitute work hashing. Optionally, each miner 16 can be further configured to not attempt to submit proof of work based on the substitute work. Each time a miner 16 finishes its current work on cached data, it will restart its hashing work using the cached data substantially as if the cached data were new data.

ii. Deterministic Synthetic Vector

Another method of performing substitute work is to cause the miners 16 to continue hashing using synthetic header and/or Merkle data that will not result in a submittable proof of work.

Somewhat similar to the above last-job-replay method, each miner 16 can execute instructions included in the miner's power control firmware 100 to generate header/Markle data with, for example, a pseudo-random generated number, and then use that generated header/Markle data to continue hashing using the generated synthetic data instead of newly retrieved or previously cached retrieved data each time the miner 16 finishes its current work. In one embodiment, each time the miner 16 finishes its current work on the generated synthetic data, it will generate new synthetic data and restart its hashing work using the generated synthetic data. In another embodiment, the miner will cache the generated synthetic data and each time the miner 16 finishes its current work on the originally generated synthetic data, it will not regenerate new synthetic data and will instead restart its hashing work using the now-cached generated synthetic data.

iii. Local Template Server

Another method of performing substitute work is to cause the miners 16 to get work from a server, e.g., miner management server 26, available directly, through the internet 22, or via the miner network 24. This method only works in cases while the miner network 24 is still available to the miners 16 and the miners 16 can communicate with the server. The server must be configured to act, or begin acting, as a mining pool proxy for the pool 8 server(s) that supply work or as a full node on the currently mined blockchain network. Under this method, upon entering the group holdover state, the miners 16 will, according to instructions in their power control firmware and/or at the direction of the group controller 10, switch their get-work requests from the pool 8 servers to the server on the miner network 24. The server will then supply new work to the miners 16, effectively allowing them to operate as if they were in a normal state and retrieving work directly from the pool 8. Additionally, the power profile can be further configured such that the miners 16 will, according to instructions in their power control firmware and/or at the direction of the group controller 10, switch their proof of work submissions from the pool 8 to the server available via the miner network 24.

This method presumes that the server has sufficient processing power and bandwidth to function as a supplier of work in substitution of the pool 8 servers and as a receiver of proof of work in substitution of the pool 8 servers. In one embodiment, the server will attempt to supply the received proof of work to the pool as a mining pool proxy for each miner 16, thus potentially enabling the group of miners 16 to participate in receiving awards. In another embodiment, the server or the miners 16 will only submit their last proof of work when work is again available as normal from the pool to the miners, thus at least providing the opportunity to participate in an award for the current block.

iv. Load Loops

Another method of performing substitute work is to cause the miners 16 to perform looping self-tests tests that exercise the mining chips 66.

In one embodiment, each miner 16 can execute instructions included in the miner's power control firmware 100 to run a self-test that is defined, for example, in the miner's power control firmware 100. The self-test will exercise the mining chips 66 in order to maintain their power consumption. The self-test may have a 100% duty cycle similar to normal-state hashing, a duty cycle that is less than 100%, and/or the duty cycle may be configurable as part of the power control profile. Additionally, the self-test may include miner 16 health diagnostic recording and reporting.

v. Group Holdover Profiles

A cryptocurrency mining site operator can configure and enact one or more group holdover profiles for the group of miners 16 at a cryptocurrency mining site. Table 2 below summarizes some, but not all, exemplary information that can be included as group holdover profiles for power control firmware 100 on each miner 16 and/or in software utilized by the group controller 10.

TABLE 2

| Group Holdover | Work Source | Select/ Sequence |
|---|---|---|
| Last Job Replay | Miner | [Exclusive]/# |
| Deterministic Synthetic Vector | Miner | [Exclusive]/# |
| Local Template Server | Server | [Exclusive]/# |
| Load Loops | Miner | Exclusive]/# |
| -- collect health data | Miner | Yes/No |

The operator can configure the power profile for the miners 16 such that the group holdover state is to be entered upon determination of a loss of work. The operator can further configure how long the group holdover state is to be maintained (e.g., a specific duration or until work is available again). Furthermore, the operator may be able to select from one or more methods of supplying substitute work during the group holdover, and how those methods of supplying substitute work are scheduled (e.g., exclusively (i.e., no other methods), sequentially, randomly) and how long they last (e.g., a time duration or one or more completions of a logical cycle).

Once the operator completes the group holdover profile portion of the power control profile, the power control software can cause the power control profile to be installed on the miners 16. For example, the group controller 10 or another device can broadcast the relevant parameters from the configured profile to all the miners 16, and their individually hosted power control firmware 100 can update itself or relevant local data storage with the relevant parameters. As another example, the group controller 10 or another device can create new power control firmware 100 with the relevant configured profile parameters and cause the newly created power control firmware 100 to be installed on each miner 16. As another example, for relevant configured profile parameters that are specific to the group controller 10, the power control software can cause the group controller 10 to be updated with the new parameters.

vi. User Interface Example

With reference to FIG. 7, a user may configure power control profile options for the group holdover operational state via sections on the relevant page in the dashboard 400 under the HOLDOVER function tab 600.

A LAST JOB REPLAY section 602 may be displayed on the HOLDOVER page of the user interface 400 after the user has selected the HOLDOVER function tab 600. For configuring the last job replay method, section 602 includes a user interface OFF/ON button for activating the method. If the method is activated in the power control profile configuration via the respective OFF/ON button, the user can select a dropdown box which could allow the user to select whether to use cached header and/or Merkle data of the current or last job prior to entering a group holdover state and/or whether to sweep fresh nonce and/or extra nonce ranges as a source of substitute work hashing. Additionally, another OFF/ON button allows the user to configure whether each miner 16 will attempt to submit proof of work based on the substitute work.

A DETERMINISTIC SYNTHETIC VECTOR section 604 may be displayed on the HOLDOVER page of the user interface 400 after the user has selected the HOLDOVER function tab 600. For configuring the deterministic synthetic vector method, section 604 includes a user interface OFF/ON button for activating the method. Additionally, another OFF/ON button allows the user to configure whether each miner 16 will generate new synthetic data or cache the generated synthetic data for use when it restarts hashing, as described above.

A LOCAL TEMPLATE SERVER section 606 may be displayed on the HOLDOVER page of the user interface 400 after the user has selected the HOLDOVER function tab 600. For configuring the local template server method, section 606 includes a user interface OFF/ON button for activating the method. If the method is activated in the power control profile configuration via the respective OFF/ON button, the user can select a dropdown box which allows the user to specify the server from which to get work.

Additionally, another dropdown box button allows the user to configure the server to which each miner 16 will attempt to submit their proof of work based on the completed work.

A LOAD LOOPS section 608 may be displayed on the HOLDOVER page of the user interface 400 after the user has selected the HOLDOVER function tab 600. For configuring the load loops method, section 608 includes a user interface OFF/ON button for activating the method. If the method is activated in the power control profile configuration via the respective OFF/ON button, the user can select a dropdown box which allows the user to specify a duty cycle the method. Additionally, another dropdown box button allows the user to configure whether each miner 16 will record and report health diagnostic data. For example, the user could select from a selection of pre-configured health diagnostic data reports.

A HOLDOVER STATE section 650 may be displayed on the HOLDOVER page of the user interface 400 after the user has selected the HOLDOVER function tab 600. This section may be used to sequence more than one activated group holdover method. For configuring the configuring the sequence of multiple group holdover methods, section 650 includes one or more dropdown box which each allows the user to select a method, such as the methods described above for group holdover, and set the order in which they will be executed. Additionally, a corresponding duration field is provided for each sequenced method and it may be used to specify a minimum time duration (e.g., in seconds) that the corresponding method must run before the sequenced method ends. Similarly, a minimum holdover duration field is provided and it may be used by a user to specify a minimum time duration (e.g., in seconds) that the group holdover operation state must operate before exiting to a new detection or operational state. This can prevent miners 16 from rapidly flipping between states under certain conditions.

c. Group Power Down

A group power down state is characterized by the group of miners 16 reducing its power consumption over time, preferably as smoothly as possible. In some embodiments, individual or subgroups of miners 16 are gradually powered down to an idle state over time. For purposes herein, an idle state is a state where the miner 16 is capable of receiving communications and responsively acting, but is not actively hashing or otherwise exercising its hash cores (e.g., as in a self test). In an embodiment where an idle state power down is not available or not practical, the group of miners 16 may be gradually powered down in subgroups (e.g., tiers) to an off state by, for example, turning off power distribution units powering subgroups of miners 16 in the group. In one embodiment, where the miners 16 in the group are moved to an off state, as opposed to an idle state, and the power control firmware 100 on one or miners 16 is responsible for determining when to move miners between detection and/or operational states (see, e.g., FIG. 5), then at least some miners 16 in the group (e.g., a least one subgroup of miners 16) will remain on (i.e., not in an off state) under the group power down methods so that the power control firmware 100 on those on miners 16 can continue to provide power control functionality.

The group power down state can be entered immediately upon loss of work detection, for example by one of the above methods, or preferably can occur after a group holdover state. It may be preferable to have a group holdover state occur prior to a group power down state because some loss of work conditions are transient in nature, and it can be beneficial to both the miners 16 and the grid to have miners 16 operating at a steady load instead of ramping up or down for each transient condition. While a group power down over time is a potentially unprofitable mode of operation for a cryptocurrency mining site, it is immensely beneficial to the grid supplying power to the miners because it avoids a steep drop in load upon loss of work to the group of miners 16.

Various methods for enacting a group power down operational state are described below. In one embodiment, once a miner 16 determines or becomes aware that a loss of work, end of a group holdover state, or other group power down triggering event has occurred, the miner 16 then moves to a group power down state, e.g., in response to commands from power control firmware 100 on the miner 16. Alternatively or additionally, the miner 16 may be instructed to move to the group power down state by, e.g., another miner 16 and/or the group controller 10.

Example configuration options are illustrated in FIG. 8 for setting options and implementing the group power down operational state via methods in a power control profile deployed via firmware on miners 16 and/or miner power management software on other computing devices. In the example dashboard 400, configuration options for the group power down operational state are shown as a POWER DOWN page displayed to a user when the user has selected function tab 700 on the dashboard. Example configuration options occupy dedicated sections 702, 704, 706, 708, 750 of the page, organized by section titles for the individual methods and for the overall group power down operational state configuration.

i. Random Start Ramp Down

One method of performing group power down of the group of miners 16 is to cause each miner 16 to reduce power gradually and to do so at a different time from at least some of the other miners 16, thereby causing the group in aggregate to gradually reduce power.

In one embodiment, each miner 16 can execute instructions included in the miner's power control firmware 100 to determine and/or use a delay time before ramping down power consumption over time to an idle state. Each miner 16 can determine its individual delay time from, for example, a range of times. For example, a range of 0 minutes to 30 minutes may be included in each miner's power control firmware 100 and/or sent from the group controller 10. Each miner 16 may, for example, randomly select a delay time within the defined range. Alternatively, the delay time may be specifically programmed in the power control firmware 100 and/or sent from the group controller 10, such that a distribution of delay times is present across the group of miners 16.

Once a miner 16 has waited the determined delay time, the miner will then enter a ramp down period where it ramps down its power consumption over time, for example by reducing its mining chip voltage and/or processing frequency, via commands by the power control firmware 100. The duration of the ramp down period before the miner enters an idle state may be defined in the power control firmware 100 and/or sent from the group controller 10. Preferably, the ramp down period for the individual miner 16 is a smooth reduction in power consumption over time. However, the ramp down period for the individual miners 16 in the group can also be tiered such that power consumption of the individual miner 16 is stepped down over time before reaching an idle state. For example, each miner 16 may operate at 75% load for a first duration, 50% load for a second duration, 25% duration for a third duration, and then idle load or just over 0% load until a new state is entered.

Alternatively, individual miners 16 in the group may follow one or more different ramp down profiles, such as an exponential ramp down profile or other non-linear ramp down over time or differing tiered percentage loads and/or differing tiered durations.

Under this group power down method, the total power consumption of the group of all the miners 16 should ramp down in a controlled and relatively linear manner over the course of the delay times plus the subsequent ramp down periods. In an alternative embodiment, the total consumption of the group of miners 16 may ramp down in a controlled but non-linear manner.

ii. Varying Start Shut Down

Another method of performing group power down of the group of miners 16 is to cause each miner 16 to move directly to an idle state, or to a power off state, but at varying times relative to at least some of the other miners 16. It should be noted that if miners 16 in the group are moved to a power off state, and at least one miner 16 in the group must remain on to maintain power control functionality for the group of miners 16, then at least one miner 16 will not move to a power off state.

In one embodiment, each miner 16 can execute instructions included in the miner's power control firmware 100 to determine and/or use a delay time before it moves to an idle state or a power off state. As with the above-described random start ramp down method, each miner 16 can determine its individual delay time from, for example, a range of times that are set by a user. For example, a range of 0 minutes to 30 minutes may be included in the miner's power control firmware 100 or sent from the group controller 10. Each miner 16 may, for example, randomly select a delay time within the defined range. Alternatively, the delay time may be specifically programmed in the power control firmware 100 and/or sent from the group controller 10, such that a distribution of delay times is present across the group of miners 16. Once a miner 16 has waited the determined delay time, the miner 16 halts hashing or other group holdover power consumption activities and move directly to an idle or a power off state.

In an alternative embodiment, a user may manually cause each miner 16 to move directly to an idle state, or to a power off state, but at varying times relative to at least some of the other miners 16. This may be accomplished via commands sent by the user from a remote device and/or via remotely or locally shutting off power to miners 16 or subgroups of miners 16 in the group.

Under this group power down method, the total power consumption of the group of all the miners 16 should ramp down over the course of the delay time in a controlled and relatively linear manner, though less linear than the random start ramp down method.

iii. Deterministic Tiers

Another method of performing group power down of the group of miners 16 is to cause pre-defined subgroups of miners 16 to reduce power at different times.

In one embodiment, each miner 16 is part of a defined subgroup. The subgroup assignment can be included in the miner's power control firmware 100 or instructed as part of group power down instructions from the group controller 10. Upon entering the group power down state under the deterministic tiers method, each miner 16 will change its power consumption based on a defined time, with all miners in a subgroup having the same defined time. The defined time can be included in the miner's power control firmware 100 or instructed as part of group power down instructions from the group controller 10. The defined time is preferably a delay time—for example one minute between subgroups. Once a miner 16 has waited the defined time, the miner will then reduce power consumption. The reduction in power consumption can take the form of a linear ramp down as with the above-described random start ramp down method, a tiered step down (e.g., 75% to 50% to 25% to idle) also as described above with respect to the random start ramp down method, or a move directly to idle as described above with respect to the varying start shut down method.

In another embodiment, the group controller 10 may have the ability to control smart power-distribution units (PDUs) which supply power to each miner subgroup. In this embodiment, the group controller 10 can shut off PDUs in a tiered fashion over time, resulting in subgroups of miners 16 being powered off at different times, thus resulting in a stepped shut down of the group of the miners 16 over time.

Under this group power down method, the total power consumption of the group of all the miners 16 should ramp down in a controlled manner over the course of at least the total delay time of all subgroups and potentially any subsequent ramp down period depending on how the configuration is implemented.

iv. Controller Directed

Another method of performing group power down of the group of miners 16 is for the group controller 10 to use power setpoints with a schedule.

In one embodiment, the group controller 10 determines a schedule for ramping down power consumption of the group of miners 16 over time. The schedule may be pre-determined in the miner power management software or otherwise obtained by the group controller 10. The group controlled then broadcasts over the miner network 24, or instructs each miner 16 individually, such that each miner 16 is notified of, or is able to determine, its individual corresponding power target(s) and when to move to the power target. The schedule times may be sent ahead, in which case each miner 16 can then execute instructions included in the miner's power control firmware 100 to enact the individual power target(s) at the specified time(s). In an alternative embodiment, at each schedule time, the power targets may be sent and each miner 16 can then execute instructions included in the miner's power control firmware 100 to enact the individual power target(s) at the time it receives the power target. The power target(s) may be power values (e.g., kilowatts), frequency values of mining chips 66, or alternatively hashrates, mining chip 66 voltages, or other miner 16 operating parameters that correspond to power consumption of the individual miner 16.

Under this group power down method, the total power consumption of the group of all the miners 16 should ramp down in a controlled manner over the course of the schedule.

v. Group Power Down Profiles

A cryptocurrency mining site operator can configure and enact one or more group power down profiles for gradually reducing a power load. Table 3 below summarizes some, but not all, exemplary information that can be included as group power down profiles for power control firmware 100 on each miner 16 and/or in software utilized by the group controller 10.

TABLE 3

| Group Power Down | Source | Start After | Select |
|---|---|---|---|
| Random Start Ramp Down | Miner/ Group Controller | Loss of Work/ Group Holdover | [Exclusive] |
| Varying Start | Miner/ | Loss of Work/ | [Exclusive] |

TABLE 3-continued

| Group Power Down | Source | Start After | Select |
|---|---|---|---|
| Shut Down Deterministic Tiers | Group Controller Miner/ Group Controller | Group Holdover Loss of Work/ Group Holdover | [Exclusive] |
| Controller Directed | Miner/ Group Controller | Loss of Work/ Group Holdover | [Exclusive] |

The operator can configure the power profile for the miners 16 such that the group power down state starts after a group holdover state ends or immediately upon determination of a loss of work. Furthermore, the operator may be able to select which method to use (e.g., exclusively for a group) and any parameters specific to the method (e.g., delay ranges, setpoints, schedules, etc.).

Once the operator completes the group power down profile portion of the power control profile, the power control software can cause the power control profile to be installed on the miners 16. For example, the group controller 10 or another device can broadcast the relevant parameters from the configured profile to all the miners 16, and their individually hosted power control firmware 100 can update itself or relevant local data storage with the relevant parameters. As another example, the group controller 10 or another device can create new power control firmware 100 with the relevant configured profile parameters and cause the newly created power control firmware 100 to be installed on each miner. As another example, for relevant configured profile parameters that are specific to the group controller 10, the power control software can cause the group controller 10 to be updated with the new parameters.

vi. User Interface Example

With reference to FIG. 8, a user may configure power control profile options for the group power down operational state via sections on the relevant page in the dashboard 400 under the POWER DOWN function tab 700.

A RANDOM START section 702 may be displayed on the POWER DOWN page of the user interface 400 after the user has selected the POWER DOWN function tab 700. For configuring the random start method, section 702 includes a user interface dropdown box for configuring the delay type. For example, the user can select a delay range from which the power control firmware on each miner 16 will randomly select a delay value, or the use can select to have a distribution of delay times specifically programmed across the power control firmwares 100 of the miners 16 in the group and/or sent from the group controller 10. A corresponding parameter field is available to the user to enter associated parameters for the delay type, such as a range of times (e.g., in seconds). Section 702 may further include a user interface dropdown box for configuring the ramp type. For example, the user can select a linear ramp down or a tiered ramp down. A corresponding parameter field is available to the user to enter associated parameters for the ramp type, such as time value (e.g., in seconds) for the duration of a linear ramp or time values and power/voltage/frequency setpoints for a tiered ramp down. For each of the delay type and the ramp type in section 702, the user can also select the controller for implementing the method. For example, the example user interface in section 702 provides a dropdown box which could allow the user to select miners 16, group controller 10, or both, for each of the types.

A VARYING START section 704 may be displayed on the POWER DOWN page of the user interface 400 after the user has selected the POWER DOWN function tab 700. For configuring the varying start method, section 704 includes a user interface dropdown box for configuring the delay type. For example, the user can select a delay range from which the power control firmware on each miner 16 will randomly select a delay value, or the use can select to have a distribution of delay times specifically programmed across the power control firmwares 100 of the miners 16 in the group and/or sent from the group controller 10. A corresponding parameter field is available to the user to enter associated parameters for the delay type, such as a range of times (e.g., in seconds). For the delay type in section 704, the user can also select the controller for implementing the method. For example, the example user interface in section 704 provides a dropdown box which could allow the user to select miners 16, group controller 10, or both, for the delay type.

A DETERMINISTIC TIERS section 706 may be displayed on the POWER DOWN page of the user interface 400 after the user has selected the POWER DOWN function tab 700. For configuring the deterministic tiers method, section 706 includes a user interface dropdown box for configuring the delay type. For example, the user can select a time interval between subgroups powering down. A corresponding parameter field is available to the user to enter associated parameters for the delay type, such as a value for the time interval (e.g., in seconds) and the number of miners 16 assigned to each subgroup. Section 706 may further include a user interface dropdown box for configuring the ramp type that each subgroup will follow. For example, the user can select a linear ramp down, a tiered ramp down, or a move directly to idle with no ramping. A corresponding parameter field is available to the user to enter associated parameters for the ramp type as described above with respect to the section 702. Similarly, for each of the delay type and the ramp type in section 706, the user can also select the controller for implementing the method as described above with respect to the section 702.

A CONTROLLER DIRECTED section 708 may be displayed on the POWER DOWN page of the user interface 400 after the user has selected the POWER DOWN function tab 700. For configuring the controller directed method, section 708 includes a user interface dropdown box for configuring the schedule type, such as a sent-ahead schedule or a real-time broadcast schedule. A corresponding parameter field is available to the user to enter associated parameters for the schedule type, times and power targets. Where practical, the user can also select the controller for implementing the method. For example, the example user interface in section 708 provides a dropdown box which could allow the user to select miners 16, group controller 10, or both, for the schedule type if the schedule type allows for selectable controller implementations.

A POWER DOWN STATE section 750 may be displayed on the POWER DOWN page of the user interface 400 after the user has selected the POWER DOWN function tab 700. This section may be used to select a power down method for deployment. In one embodiment, the power down methods are exclusive and only one power down method may be selected for deployment. In alternative embodiments, multiple power down methods may be selectable and/or sequenced, for example similar to the sequencing of group holdover methods, as described above. For configuring which power down method to deploy, section 750 includes a dropdown box which allows the user to select a method. Additionally, a minimum duration field is provided and it may be used by a user to specify a minimum time duration (e.g., in seconds) that the group power down operation state must operate in before exiting to a new detection or operational state. This can prevent miners 16 from rapidly flipping between states under certain conditions.

d. Group Power Up

A group power up state is characterized by the group of miners 16 increasing its power consumption over time, preferably as smoothly as possible. In some embodiments, the group of miners 16 is gradually powered up over time from an off state or an idle state to a normal operating state. In an embodiment where an idle state is not available or not practical, the group of miners 16 may be gradually powered up in subgroups (e.g., tiers) to a normal operating state by, for example, turning on power distribution units powering subgroups of miners 16 in the group.

The group power up state can be entered following a group power down state or during startup of cryptocurrency mining site. While a group power up over time is a potentially unprofitable mode of operation for a cryptocurrency mining site, it is immensely beneficial to the grid supplying power to the miners because it avoids a steep increase in load when the group of miners 16 start working and move to a normal operating state.

Various methods for enacting a group power up operational state are described below. In one embodiment, once a miner 16 determines or becomes aware that a group power down state is or has ended (or other group power up triggering event has occurred), the miner 16 then moves to a group power up state, e.g., in response to commands from power control firmware 100 on the miner 16. Alternatively or additionally, the miner 16 may be instructed to move to the group power up state by, e.g., another miner 16 and/or the group controller 10. In another embodiment, miners 16 in the group move to a group power state when power is restored to miners 16 in the group that have been shut down via disconnection of power supply as part of a group power down action.

Example configuration options are illustrated in FIG. 9 for setting options and implementing the group power up operational state via methods in a power control profile deployed via firmware on miners 16 and/or miner power management software on other computing devices. In the example dashboard 400, configuration options for the group power down operational state are shown as a POWER UP page displayed to a user when the user has selected function tab 800 on the dashboard. Example configuration options occupy dedicated sections 802, 804, 806, 808, 850 of the page, organized by section titles for the individual methods and for the overall group power up operational state configuration.

i. Random Start Ramp Up

One method of performing group power up of the group of miners 16 is to cause each miner 16 to increase power gradually and to do so at a different time from at least some of the other miners 16, thereby causing the group in aggregate to gradually increase power.

In one embodiment, each miner 16 can execute instructions included in the miner's power control firmware 100 to first determine a delay time before ramping up power consumption. Each miner 16 can determine its individual delay time from, for example, a range of times. For example, a range of 0 minutes to 30 minutes may be included in the miner's power control firmware 100 and/or sent from the group controller 10. Each miner 16 may, for example, randomly select a delay time within the defined range. Alternatively, the delay time may be specifically programmed in the power control firmware 100 and/or sent from the group controller 10, such that a distribution of delay times is present across the group of miners 16.

Once a miner 16 has waited the determined delay time, the miner will then enter a ramp up period where it ramps up its power consumption over time, for example by increasing its mining chip voltage and/or processing frequency, via commands by the power control firmware 100. The duration of the ramp up period may be defined in the power control firmware 100 or sent from the group controller 10. Preferably, the ramp up period for the individual miner 16 is a smooth increase in power consumption over time. However, the ramp up period for the individual miner 16 can also be tiered such that power consumption of the individual miner 16 is stepped up over time. For example, the miner 16 may operate at 25% load for a first duration, 50% load for a second duration, 75% duration for a third duration, and then 100% load until a new state is entered, such as the normal operating state.

Under this group power down method, the total power consumption of the group of all the miners 16 should ramp up in a controlled and relatively linear manner over the course of the delay time plus the subsequent ramp up period.

ii. Varying Start Power Up

Another method of performing group power up of the group of miners 16 is to cause each miner 16 to move directly to a normal operating state (e.g., 100% load) but at varying times relative to at least some of the other miners 16.

In one embodiment, each miner 16 can execute instructions included in the miner's power control firmware 100 to first determine a delay time before it moves to a normal operating state (e.g., 100% load). As with the above-described random start ramp up method, each miner 16 can determine its individual delay time from, for example, a range of times. For example, a range of 0 minutes to 30 minutes may be included in the miner's power control firmware 100 or sent from the group controller 10. Each miner 16 may, for example, randomly select a delay time within the defined range. Alternatively, the delay time may be specifically programmed in the power control firmware 100 and/or sent from the group controller 10, such that a distribution of delay times is present across the group of miners 16. Once a miner 16 has waited the determined delay time, the miner moves directly to a normal operating state (e.g., 100% load).

Under this group power up method, the total power consumption of the group of all the miners 16 should ramp up over the course of the delay time in a controlled and relatively linear manner, though less linear than the random start ramp up method.

iii. Controller Directed

Another method of performing group power up of the group of miners 16 is for the group controller 10 to use power setpoints with a schedule.

In one embodiment, the group controller 10 determines a schedule for ramping up power consumption of the group of miners 16 over time. The schedule may be pre-determined in the miner power management software or otherwise obtained by the group controller 10. The group controlled then broadcasts over the miner network 24, or instructs each miner 16 individually, such that each miner 16 is notified of, or is able to determine, its individual corresponding power target(s) and when to move to the power target. The schedule times may be sent ahead, in which case each miner 16 can then execute instructions included in the miner's power control firmware 100 to enact the individual power target(s) at the specified time(s). In an alternative embodiment, at each schedule time, the power targets may be sent and each miner 16 can then execute instructions included in the miner's power control firmware 100 to enact the individual power target(s) at the time it receives the power target. The power target(s) may be power values (e.g., kilowatts), miner chip 66 frequency, or alternatively hashrates, mining chip 66 voltages, or other miner 16 operating parameters that correspond to power consumption of the individual miner 16.

Under this group power up method, the total power consumption of the group of all the miners 16 should ramp up in a controlled manner over the course of the schedule.

iv. Gated Power Up

Another method of performing group power up of the group of miners 16 is to prohibit each miner 16 from starting until a gate condition is cleared. For example, the grid may have a power curtailment order or grid frequency response order affecting the site at which the group of miners 16 is operating, and the order may limit the power consumption at the site such that the miners 16 should not start despite the loss of work condition being resolved. As another example, the profit for mining may be insufficient for mining. Preferably, a gated power up may be implemented in combination with and sequentially before another configured group power up method.

In one embodiment, each miner 16 can execute instructions included in the miner's power control firmware 100 to first determine whether a gate condition is in effect or cleared. For example, the miner's power control firmware 100 may be able to query and determine the status of the gate condition and/or the gate determination may be sent to the miner 16 by the group controller 10 and acted upon by the miner's power control firmware 100. Once a miner 16 has determined that a gate condition is cleared, the miner's power control firmware 100 can implement another group power up method to start increasing its power consumption.

Under this group power up method, even though the loss of work condition is resolved, the group of miners 16 is protected against inadvertently violating a prohibited power consumption condition before ramping up power consumption.

v. Group Power Up Profiles

A cryptocurrency mining site operator can configure and enact one or more group power up profiles for gradually increasing a power load. Table 3 below summarizes some, but not all, exemplary information that can be included as group power up profiles for power control firmware 100 on each miner 16 and/or in software utilized by the group controller 10.

TABLE 4

| Group Power Up | Source | Select |
|---|---|---|
| Random Start Ramp Up | Miner/ Group Controller | [Exclusive] |
| Varying Start Full Power Up | Miner/ Group Controller | [Exclusive] |
| Controller Directed | Miner/ Group Controller | [Exclusive] |
| Gated Power Up | Miner/ Group Controller | Yes/No |

The operator can configure the power profile for the miners 16 such that the group power up state starts after a group power down state ends and/or upon any startup of the group of miners 16. Furthermore, the operator may be able to select which method to use (e.g., exclusively for a group) and any parameters specific to the method (e.g., delay ranges, tiers, etc.). Additionally, the operator can select whether to include a gated power up profile before a subsequent group power up profile.

Once the operator completes the group power up profile portion of the power control profile, the power control software can cause the power control profile to be installed on the miners 16. For example, the group controller 10 or another device can broadcast the relevant parameters from the configured profile to all the miners 16, and their individually hosted power control firmware 100 can update itself or relevant local data storage with the relevant parameters. As another example, the group controller 10 or another device can create new power control firmware 100 with the relevant configured profile parameters and cause the newly created power control firmware 100 to be installed on each miner. As another example, for relevant configured profile parameters that are specific to the group controller 10, the power control software can cause the group controller 10 to be updated with the new parameters.

vi. User Interface Example

With reference to FIG. 9, a user may configure power control profile options for the group power up operational state via sections on the relevant page in the dashboard 400 under the POWER UP function tab 900.

A RANDOM START section 802 may be displayed on the POWER UP page of the user interface 400 after the user has selected the POWER UP function tab 800. For configuring the random start method, section 802 includes a user interface dropdown box for configuring the delay type. For example, the user can select a delay range from which the power control firmware on each miner 16 will randomly select a delay value, or the use can select to have a distribution of delay times specifically programmed across the power control firmwares 100 of the miners 16 in the group and/or sent from the group controller 10. A corresponding parameter field is available to the user to enter associated parameters for the delay type, such as a range of times (e.g., in seconds). Section 802 may further include a user interface dropdown box for configuring the ramp type. For example, the user can select a linear ramp up or a tiered ramp up. A corresponding parameter field is available to the user to enter associated parameters for the ramp type, such as time value (e.g., in seconds) for the duration of a linear ramp or time values and power/voltage/frequency setpoints for a tiered ramp up. For each of the delay type and the ramp type in section 802, the user can also select the controller for implementing the method. For example, the example user interface in section 802 provides a dropdown box which could allow the user to select miners 16, group controller 10, or both, for each of the types.

A VARYING START section 804 may be displayed on the POWER UP page of the user interface 400 after the user has selected the POWER UP function tab 800. For configuring the varying start method, section 804 includes a user interface dropdown box for configuring the delay type. For example, the user can select a delay range from which the power control firmware on each miner 16 will randomly select a delay value, or the use can select to have a distribution of delay times specifically programmed across the power control firmwares 100 of the miners 16 in the group and/or sent from the group controller 10. A corresponding parameter field is available to the user to enter associated parameters for the delay type, such as a range of times (e.g., in seconds). For the delay type in section 804, the user can also select the controller for implementing the method. For example, the example user interface in section 804 provides a dropdown box which could allow the user to select miners 16, group controller 10, or both, for the delay type.

A CONTROLLER DIRECTED section 806 may be displayed on the POWER UP page of the user interface 400 after the user has selected the POWER UP function tab 800. For configuring the controller directed method, section 806 includes a user interface dropdown box for configuring the schedule type, such as a sent-ahead schedule or a real-time broadcast schedule. A corresponding parameter field is available to the user to enter associated parameters for the schedule type, times and power targets. Where practical, the user can also select the controller for implementing the method. For example, the example user interface in section 806 provides a dropdown box which could allow the user to select miners 16, group controller 10, or both, for the schedule type if the schedule type allows for selectable controller implementations.

A GATED section 808 may also be similarly displayed on the POWER UP page of the user interface 400 after the user has selected the POWER UP function tab 800. Section 808 includes a YES/NO box which the user set to activate the method. Additionally, one or more specific conditions can be set for the method, for example, by selecting a condition from a condition dropdown box. For example, the user may select from conditions such as checking for a grid curtailment condition, a grid frequency response condition, or profit condition as described above. One or more parameters associated with the condition, such as TRUE/FALSE or a minimum acceptable profit value may additionally be entered by the user in the condition parameters field and used by the power management firmware 100 or miner power management software to determine whether the activated condition is met. The illustration of two conditions for each method is illustrative only and more or fewer conditions may be available in section 808.

A POWER UP STATE section 850 may be displayed on the POWER UP page of the user interface 400 after the user has selected the POWER UP function tab 800. This section may be used to select a group power up method for deployment. In one embodiment, the group power up methods are exclusive, except for the gated method, and only one group power up method may be selected for deployment in section 850. It should be understood the gated power up method is activated separately in its own section 808 and, if activated, will occur prior in sequence to an otherwise exclusive group power up method selected in section 850. In alternative embodiments, multiple power up methods may be selectable and/or sequenceable, for example similar to the sequencing of group holdover methods, as described above. For configuring which power up method to deploy, section 850 includes a dropdown box which allows the user to select a method. Additionally, a minimum duration field is provided and it may be used by a user to specify a minimum time duration (e.g., in seconds) that the group power up operation state must operate in before exiting to a new detection or operational state. This can prevent miners 16 from rapidly flipping between states under certain conditions.

G. POWER CONTROL EXAMPLES

Following are embodiments of examples implementations of power control profiles for a group of miners 16.

a. Holdover Only

Figure 4:
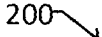
FIG. 4 illustrates a flowchart of a method for miner power management for a group of miners.
Figure 4:
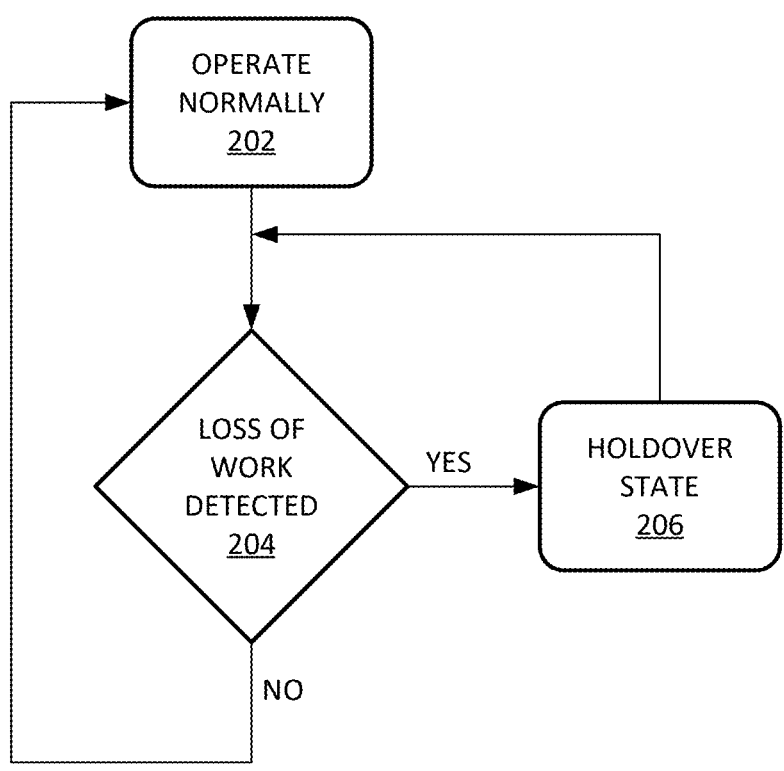

Referring to FIG. 4, a method 200 is illustrated for controlling the power of a group of miners 16. In one embodiment, the method 200 is operated by the group controller 10, which communicates instructions to the miners 16 for operating the method 200 at the time of the event. Alternatively, the miners 16 themselves independently execute the substitute work configurations under method 200 and the power control firmware 100 of each miner 16 is capable of controlling the operation of each miner 16 to carry out the method 200. In a hybrid example, the group controller 10 controls a portion of the miners 16, while the remaining miners 16 operate under the method 200 with instructions from their individual power control firmware 100.

The method 200 cycles continuously, preferably at a predetermined interval. At block 202, each miner 16 (or at least substantially all of the miners 16) of the group is operated at a normal operating state.

At block 204, in one embodiment where the miners 16 operate independently based on their individual power control firmware 100, the power control firmware 100 of at least one miner 16 determines whether loss of work has been detected—for example, according to one or more of the embodiments described above. If a loss of work is detected at block 204, all miners 16 in the group eventually determine the same loss of work and/or are notified of the loss of work—for example, according to one or more of the embodiments described above. If a loss of work is not detected at block 204, each miner 16 in the group continues to operate under the normal operating state at block 202.

At block 206, as each miner 16 determines or is notified of the loss of work, each respective miner 16 enters a group holdover state, with all miners 16 in the group eventually entering the group holdover state. While in the group holdover state, the power control firmware 100 of the miners 16 continue to check at block 204 whether loss of work is still detected. If a loss of work is still detected, each miner 16 continues to operate in the group holdover state at block 206. When the power control firmware 100 of at least one miner 16 determines that loss of work is no longer detected, for example, according to one or more of the embodiments described above, that miner 16 returns to a normal operating state at block 202. Similarly, all miners 16 in the group eventually determine that loss of work is no longer detected and/or are notified of the same, according to one or more of the embodiments described above, and subsequently all of the miners 16 in the group individually return to a normal operating state at block 202.

Other embodiments of the above method are contemplated where the group controller 10 implements at least some steps in blocks 204 and/or 206, for example as described in the embodiments above with respect to detecting loss of work, detecting that work is available, and/or operating in a group holdover state.

b. Holdover & Ramp

Figure 5:
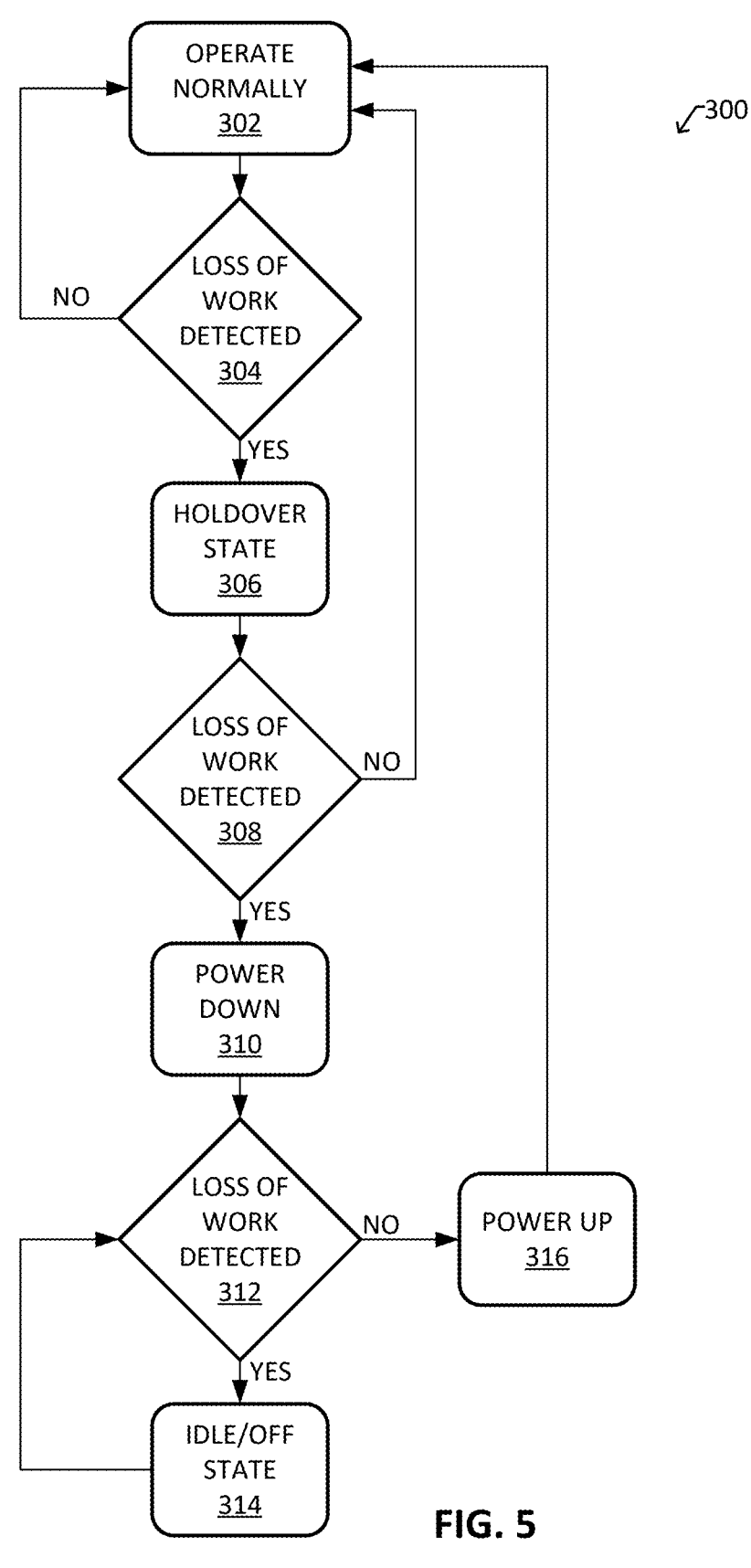
FIG. 5 illustrates a flowchart of a method for miner power management for a group of miners.

Referring to FIG. 5, a method 300 is illustrated for controlling the power of a group of miners 16. In one embodiment, the method 300 is operated by the group controller 10, which communicates instructions to the miners 16 for operating the method 300. Alternatively, the miners 16 themselves independently execute the substitute work configurations under method 300 and the power control firmware 100 of each miner 16 is capable of controlling the operation of each miner 16 to carry out the method 300. In a hybrid example, the group controller 10 controls a portion of the miners 16, while the remaining miners 16 operate under the method 300 with instructions from its own power control firmware 100.

The method 300 cycles continuously, preferably at a predetermined interval. Blocks 302, 304, and 306 operate essentially the same as blocks 202, 204, and 206, respectively, in FIG. 4, except block 306 may have a pre-determined minimum duration time and/or a dynamically adjustable duration time before proceeding to block 308.

Block 308 operates essentially the same as block 204 in FIG. 4, except that upon determination that loss of work continues to exist, each miner 16 in the group eventually moves to a group power down state at block 310, according to the individual configuration of each miner 16, including any required duration time in the group holdover state at block 306.

At block 310, each miner 16 enters a group power down state, with all miners 16 in the group eventually entering the group power down state. It should be noted that if miners 16 in the group are moved to a power off state via the group power down state and at least one miner 16 in the group must remain on to maintain power control functionality for the group of miners 16, then at least one miner 16 will not move to a power off state at block 310.

Block 312 operates essentially the same as block 304 in determining and/or notifying, eventually for all miners 16 in the group, whether a loss of work is still detected. If loss of work is no longer detected, then each miner 16 in the group will eventually move to the group power up state and then subsequently to the normal operating state at block 302. If loss of work continues to be detected at block 312, eventually each miner 16 in the group will have reached an idle or power off state in block 314 and remain there until loss of work is no longer detected at block 312. As noted with respect to block 310, under certain conditions at least one miner 16 may remain on when all other miners 16 have moved to a power off state.

Other embodiments of the above method are contemplated where the group controller 10 implements at least some steps at one or more of blocks 304, 306, 308, 310, 312, 314, 316 for example as described in the embodiments above with respect to detecting loss of work, detecting that work is available, and/or operating in a specific group state.

H. ADDITIONAL CONTROLS & SAFEGUARDS

In a preferred embodiment, during operation of the miners 16 in the group holdover state, there is no share leakage. Preferably, proof of work derived from substitute work never leaves the miner network, unless potentially the substitute work is supplied by a server on the miner network 24 acting as a mining pool proxy for a pool 8 server. Furthermore, individual miner 16 credentials for the one or more pools 8 are latched during operation in a group holdover state, such that each miner 16 can quickly return to a normal operating state and exchange work and proof of work with the pool(s) 8.

In a preferred embodiment, monitoring telemetry from the miners 16 remains on and active during operation in group holdover state so temperatures, voltages, fan RPMs, etc., can continue to be monitored.

In a preferred embodiment, the miners 16 and/or the group controller 10 provide persistence and auditing. For example, one or more of each power control firmware 100 and/or the group controller logs time entries for, for example, group holdover state, group power down state, group power up state, idle state, power ramp curves, setpoints, etc. for compliance purposes and/or reporting to a grid operator.

I. CONCLUSION

While the present disclosure shows several illustrative embodiments, it should be understood that these embodiments are designed to be examples of the principles of the disclosed methods and systems. They are not intended to limit the broad aspects of the disclosed concepts solely to the specific embodiments that have been illustrated. As will be realized by one skilled in the art, the power control profiles, interfaces, systems, and methods, and associated functionality and methods of operation, are capable of other and different configurations. Furthermore, several of their details are capable of being modified in various respects, all without departing from the fundamental scope of the disclosed methods and systems. For example, one or more of the disclosed embodiments, either in part or in whole, may be combined with another disclosed embodiment to create hybrid implementations. As such, one or more steps from the diagrams or components in the Figures may be selectively omitted or combined in a manner that is consistent with the principles of the disclosed power control profiles, interfaces, systems, and methods. Additionally, the order of one or more steps may be omitted or performed in a different order than what is explicitly described. Accordingly, the drawings, diagrams, and the detailed description provided herein are to be regarded as illustrative in nature, and not as restrictive or limiting.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles have been presented, they need not be utilized in combination, and many combinations of aspects and principles are possible in light of the various embodiments provided above.

As is well known in the data processing and communications arts, a general-purpose computer typically comprises a central processor or other processing device, an internal communication bus, various types of memory or storage media (e.g., RAM, ROM, EEPROM, cache memory, disk drives, etc.) for code and data storage, and one or more network interface cards or ports for communication purposes. The software functionalities that are described herein involve programming, which includes executable code as well as associated stored data. This software code is executable by the general-purpose computer. In operation, the code is stored within the memory of the general-purpose computer platform. At other times, however, the software may be stored at other locations or transported for loading into the appropriate general-purpose computer system.

A server, for example, typically includes a data communication interface for engaging in packet data communication over a network. The server also includes a central processing unit (CPU), which may be in the form of one or more processors, for executing the program instructions. The server platform typically includes an internal communication bus, program storage, and data storage for the various data files that are to be processed or communicated by the server, although the server often receives its programming and data via network communications. The hardware elements, operating systems, and programming languages of such servers are conventional in nature, and it is presumed that those who are skilled in the art are adequately familiar therewith. The server functions may be implemented in a distributed fashion on a number of similar platforms to distribute the processing load.

Hence, aspects of the disclosed methods and systems that are outlined above may be embodied in the form of computer programming. Program aspects of the technology may be thought of as "products" or "articles of manufacture," which are typically in the form of executable code or associated data that is carried on or embodied in a type of machine-readable medium. "Storage" type media includes any or all of the tangible memory of the computers, processors, or the like, or any associated modules thereof. This may include various semiconductor memories, tape drives, disk drives, and the like, which may provide non-transitory storage at any time for the software programming. All or portions of the software may at times be communicated through the Internet or various other telecommunication networks. Thus, another type of media that may bear the software elements includes optical, electrical, and electromagnetic waves, such as those that are used across physical interfaces between local devices, through wired and optical landline networks, and over various air-links. The physical elements that carry such waves, such as wired or wireless links, optical links, or the like, also may be considered as media that bear the software. As used herein, unless specifically restricted to non-transitory, tangible "storage" media, terms such as computer or machine "readable medium" refer to any medium that participates in the process of providing instructions to a processor for execution.

A machine-readable medium may take many forms, including but not limited to, a tangible storage medium, a carrier wave medium, or a physical transmission medium. Non-volatile storage media include, for example, optical or magnetic disks, such as any of the storage devices in any computer or computers or the like, such as may be used to implement the disclosed methods and systems. Volatile storage media include dynamic memory, such as the main memory of such a computer platform. Tangible transmission media include components such as coaxial cables, copper wire, and fiber optics, including the wires that comprise a bus within a computer system. Carrier-wave transmission media can take the form of electric or electromagnetic signals, or acoustic or light waves, such as those that are generated during radio frequency (RF) and infrared (IR) data communications. Common forms of computer-readable media therefore include, for example: a floppy disk, a flexible disk, a hard disk, magnetic tape, any other magnetic medium, a CD-ROM, a DVD or DVD-ROM, any other optical medium, punch cards, paper tape, any other physical storage medium with patterns of holes, a RAM, a PROM and EPROM, a FLASH-EPROM, any other memory chip or cartridge, a carrier wave that is transporting data or instructions, cables or links that are transporting such a carrier wave, or any other medium from which a computer can read programming code or data. Many of these forms of computer-readable media may be involved in carrying one or more sequences of one or more instructions to a processor for execution.

It is to be understood that the invention is not limited to the exact details of construction, operation, exact materials, or specific embodiments shown and described herein, as obvious modifications and equivalents will be apparent to one who is skilled in the art. While the specific embodiments have been illustrated and described in detail, numerous modifications may come to mind without significantly departing from the spirit of the invention, and the scope of protection is only limited by the scope of the accompanying Claims. In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such a feature is required in all embodiments and, in some embodiments, may not be included or may be combined with other features.

It should also be understood that other configurations or arrangements of the above-described components are contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

The following applications are hereby incorporated by reference for any purpose: U.S. patent application Ser. Nos. 17/716,651, 18/154,142, 18/893,899, each of which is expressly incorporated by reference herein in its entirety.

In this Application, to the extent any U.S. patents, U.S. patent applications, or other materials (e.g., articles) have been incorporated by reference, the text of such materials is only incorporated by reference to the extent that it does not conflict with the materials, statements, and drawings set forth herein. In the event of such a conflict, the text of the present document controls, and terms in this document should not be given a narrower reading in virtue of the way in which those terms are used in other materials incorporated by reference. It should also be understood that structures or features not directly associated with cryptocurrency power control for a group of miners cannot be adopted or implemented into the disclosed power control profiles, interfaces, systems, and methods without careful analysis and verification of the complex realities of designing, testing, manufacturing, and operation. Theoretical designs that attempt to implement such modifications are insufficient, and in some instances, woefully insufficient, because they amount to mere design exercises that are not tethered to the complex realities of successfully designing, manufacturing, and testing a grid-scale load of miners.

The invention claimed is:

1. A non-transitory computer-readable medium storing thereon computer-executable instructions that, when executed by a processor cause the processor to perform:

detecting a loss of work for a plurality of cryptocurrency mining machines, wherein prior to the detection of the loss of work the plurality of cryptocurrency mining machines were hashing in a normal operating state and able to earn a reward as a result of the hashing; and sending one or more commands that cause the plurality of cryptocurrency mining machines to enter a group holdover state, wherein the plurality of cryptocurrency mining machines consume substantially the same amount of power in the group holdover state as when the plurality of cryptocurrency mining machines were operating in the normal operating state and the plurality of cryptocurrency mining machines are not able to earn a reward while in the group holdover state.

2. The non-transitory computer-readable medium of claim 1, wherein detecting the loss of work comprises detecting a loss of network connectivity between the plurality of cryptocurrency mining machines and a remote mining pool.

3. The non-transitory computer-readable medium of claim 2, wherein detecting the loss of network connectivity comprises monitoring for failed ping acknowledgments or missed heartbeat pings from the remote mining pool.

4. The non-transitory computer-readable medium of claim 1, wherein detecting the loss of work comprises detecting failed share submissions from at least one of the plurality of cryptocurrency mining machines to a remote mining pool.

5. The non-transitory computer-readable medium of claim 1, wherein detecting the loss of work comprises detecting failed work requests from at least one of the plurality of cryptocurrency mining machines to a remote mining pool.

6. The non-transitory computer-readable medium of claim 1, wherein the group holdover state comprises causing the plurality of cryptocurrency mining machines to perform substitute work selected from the group consisting of: replaying last job data, generating deterministic synthetic vectors, retrieving work from a local template server, and performing load loop self-tests.

7. The non-transitory computer-readable medium of claim 6, wherein the substitute work comprises replaying cached header data and Merkle data from a previously received job.

8. The non-transitory computer-readable medium of claim 1, wherein the computer-executable instructions further cause the processor to perform detecting that work is available again for the plurality of cryptocurrency mining machines and sending one or more commands that cause the plurality of cryptocurrency mining machines to exit the group holdover state and return to the normal operating state.

9. The non-transitory computer-readable medium of claim 1, wherein the computer-executable instructions further cause the processor to perform, after a predetermined duration in the group holdover state, sending one or more commands that cause the plurality of cryptocurrency mining machines to enter a group power down state in which power consumption is gradually reduced over time.

10. The non-transitory computer-readable medium of claim 9, wherein the group power down state comprises causing individual cryptocurrency mining machines to reduce power consumption at different times to create a gradual reduction in total power consumption across the plurality of cryptocurrency mining machines.

11. A non-transitory computer-readable medium storing thereon computer-executable instructions that, when executed by a processor cause the processor to perform:

detecting a loss of connectivity between a remote cryptocurrency mining pool and one or more cryptocurrency mining machines in a plurality of cryptocurrency mining machines, wherein the one or more cryptocurrency mining machines retrieve their respective work for hashing from the remote cryptocurrency mining pool; and sending one or more commands that cause at least a portion of the cryptocurrency mining machines in the plurality to each switch from retrieving their respective work for hashing from the remote cryptocurrency mining pool to each generating substitute work and using the generated substitute work for their respective hashing.

12. The non-transitory computer-readable medium of claim 11, wherein the substitute work comprises replaying cached header data and Merkle data from a previously received job.

13. The non-transitory computer-readable medium of claim 11, wherein the substitute work comprises generating synthetic header data with pseudo-random numbers.

14. The non-transitory computer-readable medium of claim 11, wherein the substitute work comprises retrieving work from a local template server on a local network.

15. The non-transitory computer-readable medium of claim 11, wherein the substitute work comprises performing load loop self-tests that exercise mining chips in the cryptocurrency mining machines.

16. The non-transitory computer-readable medium of claim 11, wherein the computer-executable instructions further cause the processor to perform, after a predetermined condition is met, sending one or more commands that cause the at least the portion of the cryptocurrency mining machines to enter a group power down state in which individual cryptocurrency mining machines reduce power consumption at different times.

17. The non-transitory computer-readable medium of claim 16, wherein the group power down state comprises causing the at least the portion of the cryptocurrency mining machines to individually determine respective delay times from a range of times and reduce power consumption after waiting their respective determined delay times.

18. The non-transitory computer-readable medium of claim 16, wherein the group power down state comprises causing pre-defined subgroups of the cryptocurrency mining machines to reduce power consumption at different pre-determined times.

19. The non-transitory computer-readable medium of claim 16, wherein the computer-executable instructions further cause the processor to perform detecting that connectivity has been restored between the remote cryptocurrency mining pool and the at least one of the one or more cryptocurrency mining machines and sending one or more commands that cause at least the portion of the cryptocurrency mining machines to enter a group power up state.

20. The non-transitory computer-readable medium of claim 19, wherein the group power up state comprises causing at least the portion of cryptocurrency mining machines to individually increase power consumption gradually over time at different start times to create a controlled increase in total power consumption across the at least the portion of the cryptocurrency mining machines over time.

21. The non-transitory computer-readable medium of claim 19, wherein the group power up state comprises determining whether a gate condition is cleared before allowing the at least a portion of the cryptocurrency mining machines to increase power consumption.

22. The non-transitory computer-readable medium of claim 11, wherein connectivity between a remote cryptocurrency mining pool and one or more cryptocurrency mining machines in the plurality of cryptocurrency mining machines is via a mining pool proxy, wherein the one or more cryptocurrency mining machines retrieve their respective work for hashing from the remote cryptocurrency mining pool via the mining pool proxy;

wherein detecting a loss of connectivity between a remote cryptocurrency mining pool and one or more cryptocurrency mining machines in the plurality of cryptocurrency mining machines comprises detecting a loss of connectivity between: (i) the remote cryptocurrency mining pool via the mining pool proxy, or (ii) one or more cryptocurrency mining machines in the plurality of cryptocurrency mining machines and the mining pool proxy.

23. A method for power management of a plurality of cryptocurrency mining machines, the method comprising:

detecting a loss of work for at least one cryptocurrency mining machine in a plurality of cryptocurrency mining machines, causing the plurality of cryptocurrency mining machines to perform substitute hashing work, wherein the plurality of cryptocurrency mining machines performing the substitute hashing consumes a first amount of power, wherein the substitute hashing work does not generate valid hashes directed toward a cryptocurrency mining reward, and wherein the first amount of power is substantially the same as a second amount of power that the plurality of cryptocurrency mining machines consume when performing hashing work to generate valid hashes directed toward a cryptocurrency mining reward.

24. The method of claim 23, wherein causing the plurality of cryptocurrency mining machines to perform substitute hashing work comprises sending instructions from a power control firmware stored locally on each of the plurality of cryptocurrency mining machines, wherein the power control firmware on each cryptocurrency mining machine independently determines when to begin performing the substitute hashing work.

25. The method of claim 23, wherein causing the plurality of cryptocurrency mining machines to perform substitute hashing work comprises sending instructions from a group controller to the plurality of cryptocurrency mining machines over a local network, wherein the group controller coordinates the timing of when each of the plurality of cryptocurrency mining machines begins performing the substitute hashing work.

26. The method of claim 23, wherein causing the plurality of cryptocurrency mining machines to perform substitute hashing work comprises sending instructions from both power control firmware stored locally on each of the plurality of cryptocurrency mining machines and a group controller, wherein the power control firmware generates the substitute hashing work and the group controller provides an instruction to generate the substitute hashing work.

27. A system for power management of a cryptocurrency mining machine, the system comprising:

a cryptocurrency mining machine comprising a processor, data storage, and a mining chip, wherein the mining chip performs hashing work based on data received from a remote computing device about a blockchain; and a power control firmware stored on the cryptocurrency mining machine and in operable communication with the processor, wherein the power control firmware is configured to:

determine that a loss of connectivity has occurred between the cryptocurrency mining machine and the remote computing device, responsive to the determination, cause the processor to generate substitute data at the cryptocurrency mining machine, and cause the mining chip to perform hashing work based on the generated substitute data, wherein the cryptocurrency mining machine consumes a first amount of power while performing hashing work based on the data received from the remote computing device and consumes a second amount of power while performing hashing work based on the substitute data generated at the processor, and wherein the first amount of power and the second amount of power are the same.

28. The system of claim 27, wherein the power control firmware is further configured to:

detect that the substitute hashing work has been performed for a predetermined duration; and cause the cryptocurrency mining machine to gradually reduce power consumption over time by sending instructions to ramp down power consumption of the cryptocurrency mining machine.

29. The system of claim 28, wherein the instructions from the power control firmware cause the cryptocurrency mining machine to reduce power consumption at a different time from at least some other cryptocurrency mining machines in a group of cryptocurrency mining machines, thereby creating a gradual reduction in total power consumption across the group of cryptocurrency mining machines.

30. The system of claim 28, wherein the instructions from the power control firmware cause the cryptocurrency mining machine to reduce power consumption by decreasing at least one of mining chip voltage and processing frequency over a ramp down period.

* * * * *